(12) United States Patent
Nakanishi

(10) Patent No.: US 11,989,380 B2
(45) Date of Patent: May 21, 2024

(54) SENSOR MODULE AND DISPLAY DEVICE INCLUDING THE SENSOR MODULE

(71) Applicant: Japan Display Inc., Tokyo (JP)

(72) Inventor: Takayuki Nakanishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/884,804

(22) Filed: Aug. 10, 2022

(65) Prior Publication Data

US 2023/0072599 A1 Mar. 9, 2023

(30) Foreign Application Priority Data

Sep. 3, 2021 (JP) .................................. 2021-144000

(51) Int. Cl.
*G06F 3/044* (2006.01)
(52) U.S. Cl.
CPC .................................. *G06F 3/0446* (2019.05)
(58) Field of Classification Search
CPC .......................... G06F 3/04164; G06F 3/0446
See application file for complete search history.

(56) References Cited

U.S. PATENT DOCUMENTS

| | | | |
|---|---|---|---|
| 2011/0090170 A1* | 4/2011 | Lin | G06F 3/0446 345/174 |
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2014/0285728 A1* | 9/2014 | Lee | G06F 3/041 349/12 |
| 2016/0209965 A1* | 7/2016 | Kim | G06F 3/0443 |
| 2019/0339816 A1* | 11/2019 | Hsu | G06F 3/0448 |
| 2022/0050571 A1* | 2/2022 | Lu | G06F 3/0418 |

* cited by examiner

*Primary Examiner* — Priyank J Shah
(74) *Attorney, Agent, or Firm* — K&L Gates LLP

(57) ABSTRACT

The sensor module includes a sensor substrate, a plurality of sensor electrodes, and a plurality of sensor wirings. The sensor substrate has a sensor region and a sensor frame region surrounding the sensor region. The plurality of sensor electrodes is located over the sensor region and is arranged in a plurality of rows and a plurality of columns. The plurality of sensor wirings respectively corresponds to the plurality of sensor electrodes, is electrically connected to the corresponding sensor electrodes, respectively, and each has a terminal over the sensor frame region. The plurality of terminals is arranged along a side of the sensor region. At least one of the sensor wirings connected to the sensor electrode includes a resistance-adjusting portion in each column. A resistance of the resistance-adjusting portion is higher than a resistance of another portion in the sensor wiring including the resistance-adjusting portion.

13 Claims, 18 Drawing Sheets

SENSOR MODULE AND DISPLAY DEVICE INCLUDING THE SENSOR MODULE

CROSS-REFERENCE TO RELATED APPLICATIONS

This application claims the benefit of priority to Japanese Patent Application No. 2021-144000, filed on Sep. 3, 2021, the entire contents of which are incorporated herein by reference.

FIELD

An embodiment of the present invention relates to a sensor module and a display device including the sensor module. For example, an embodiment of the present invention relates to a non-contact type sensor module and a display device including the non-contact type sensor module.

BACKGROUND

As an interface for inputting information to an information terminal, a touch sensor has been widely used. Currently, the mainstream touch sensors identify a position at which human fingers or hands directly contact the touch sensors. In recent years, a non-contact type sensor (hover sensor) has been developed in which information can be input by placing an input jig such as human fingers or hands or a touch pen (hereinafter, they are also referred to as an input means) close to the touch sensor without causing the input jig to contact the touch sensor (see, US Patent Application Publications No. 2014/0049486, 2013/0342498, and 2014/0049508).

SUMMARY

An embodiment of the present invention is a sensor module. The sensor module includes a sensor substrate, a plurality of sensor electrodes, and a plurality of sensor wirings. The sensor substrate has a sensor region and a sensor frame region surrounding the sensor region. The plurality of sensor electrodes is located over the sensor region and is arranged in a plurality of rows and a plurality of columns. The plurality of sensor wirings respectively corresponds to the plurality of sensor electrodes, is electrically connected to the corresponding sensor electrodes, respectively, and each has a terminal over the sensor frame region. The plurality of terminals is arranged along a side of the sensor region. At least one of the sensor wirings connected to the sensor electrodes includes a resistance-adjusting portion in each column. A resistance of the resistance-adjusting portion is higher than a resistance of another portion in the sensor wiring including the resistance-adjusting portion.

An embodiment of the present invention is a sensor module. The sensor module includes a sensor substrate, a plurality of sensor electrodes, and a plurality of sensor wirings. The sensor substrate has a sensor region and a sensor frame region surrounding the sensor region. The plurality of sensor electrodes is located over the sensor region and is arranged in a plurality of rows and a plurality of columns. The plurality of sensor wirings respectively corresponds to the plurality of sensor electrodes, is electrically connected to the corresponding sensor electrodes, respectively, and each has a terminal over the sensor frame region. The plurality of terminals is arranged along a side of the sensor region. At least one of the sensor electrodes has at least one cutoff in each column.

An embodiment of the present invention is a display device. The display device includes a display module including an array substrate having a plurality of pixels; and a sensor module over the display module. The sensor module includes a sensor substrate, a plurality of sensor electrodes, and a plurality of sensor wirings. The sensor substrate has a sensor region and a sensor frame region surrounding the sensor region. The plurality of sensor electrodes is located over the sensor region and is arranged in a plurality of rows and a plurality of columns. The plurality of sensor wirings respectively corresponds to the plurality of sensor electrodes, is electrically connected to the corresponding sensor electrodes, respectively, and each has a terminal over the sensor frame region. The plurality of terminals is arranged along a side of the sensor region. At least one of the sensor wirings connected to the sensor electrode includes a resistance-adjusting portion in each column. A resistance of the resistance-adjusting portion is higher than a resistance of another portion in the sensor wiring including the resistance-adjusting portion.

An embodiment of the present invention is a display device. The display device includes a display module including an array substrate having a plurality of pixels; and a sensor module over the display module. The sensor module includes a sensor substrate, a plurality of sensor electrodes, and a plurality of sensor wirings. The sensor substrate has a sensor region and a sensor frame region surrounding the sensor region. The plurality of sensor electrodes is located over the sensor region and is arranged in a plurality of rows and a plurality of columns. The plurality of sensor wirings respectively corresponds to the plurality of sensor electrodes, is electrically connected to the corresponding sensor electrodes, respectively, and each has a plurality of terminals over the sensor frame region. The plurality of terminals is arranged along a side of the sensor region. At least one of the sensor electrodes has at least one cutoff in each column.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. When a plurality of the same or similar structures is collectively represented, a reference number is used, while a hyphen and a natural number follow the reference number when the structures are independently represented. In addition, when a part of a structure is represented, a small letter of the alphabet may be provided after the reference number.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

In the embodiments of the present invention, when a plurality of films is formed with the same process at the same time, these films have the same layer structure, the same material, and the same composition. Hence, the plurality of films is defined as existing in the same layer.

Hereinafter, the structures of a sensor module 200 and a display device 100 including the sensor module 200 according to an embodiment of the present invention are explained.

1. OUTLINE STRUCTURE

Figure 1:
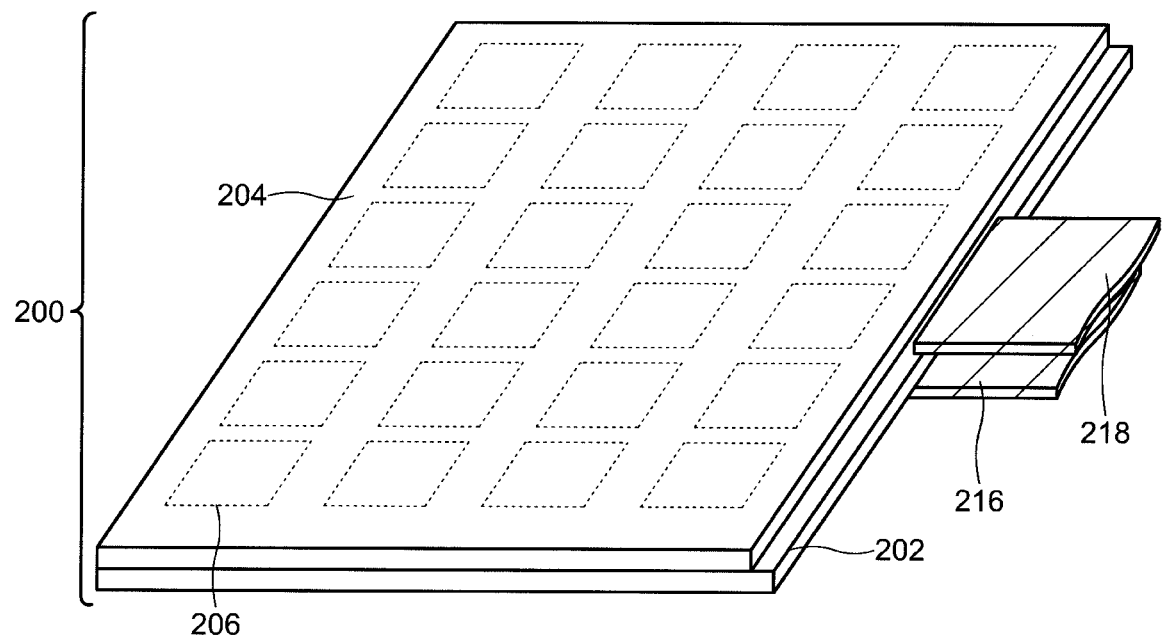
FIG. 1 is a schematic developed view of a display device according to an embodiment of the present invention.
Figure 1:
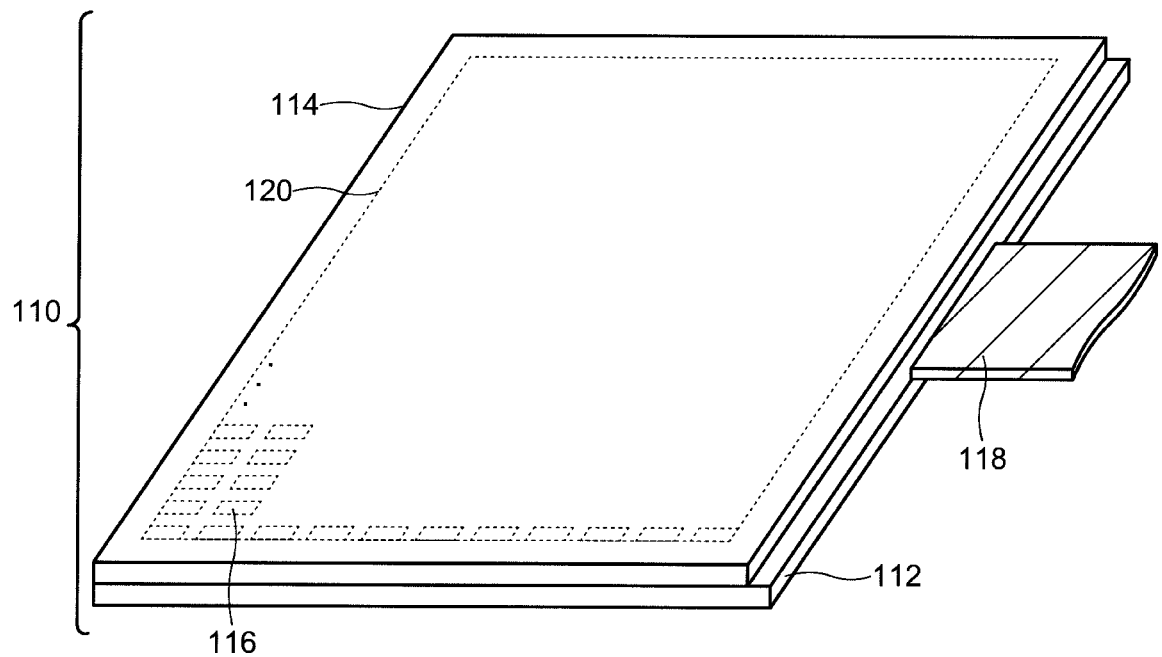

A schematic developed view of the display device 100 is shown in FIG. 1. The display device 100 includes a display module 110 and the sensor module 200 arranged over the display module 110. The display module 110 and the sensor module 200 are fixed to each other with an adhesive which is not illustrated in FIG. 1.

2. DISPLAY MODULE

The display module 110 is a device having a function to display an image and includes an array substrate 112, a plurality of pixels 116 formed over the array substrate 112, and a counter substrate 114 over the array substrate 112 as fundamental components. A minimum rectangular region surrounding the plurality of pixels 116 is called a display region 120. Each pixel 116 has a display element and functions as a minimum unit providing color information. As the display element, an electroluminescence light-emitting element exemplified by an organic electroluminescence light-emitting element (OLED) or the like may be used in addition to a liquid crystal element. When a liquid crystal element is employed, a light source (backlight) which is not illustrated is further provided to the display module 110. Each pixel 116 is operated according to a power source and image signals supplied through a connector 118 such as a flexible printed circuit (FPC) substrate and produces light with a specific color at a gradation on the basis of the image signals. The operation of the pixels 116 is controlled on the basis of the image signals, by which an image can be displayed on the display region 120.

There is no limitation to the size of the display module 110. For example, the size thereof may be a size called a 12.1 inch (31 cm) size which is used for a portable communication terminal or a size (e.g., a 14.1 inch (36 cm) to 32 inch (81 cm) size) suitable for a monitor connected to a computer, a television, or a signage, and a larger size is also acceptable.

3. SENSOR MODULE 3-1. Outline Structure

The sensor module 200 is a device allowing the light from the display module 110 to pass therethrough and functioning as an interface for inputting information to the display device 100. The sensor module 200 is a so-called non-contact type sensor module and has a function to detect an input means such as a finger, a palm, a touch pen provided with a resin at a tip thereof and to identify a position of the input means over the sensor module 200 not only in the case where the input means contacts with the sensor module 200 but also in the case where the input means does not contact with the sensor module 200 but is arranged at a vicinity (e.g., within 5 mm, 10 mm, or 20 mm from the outermost surface of the sensor module 200) thereof.

Figure 2:
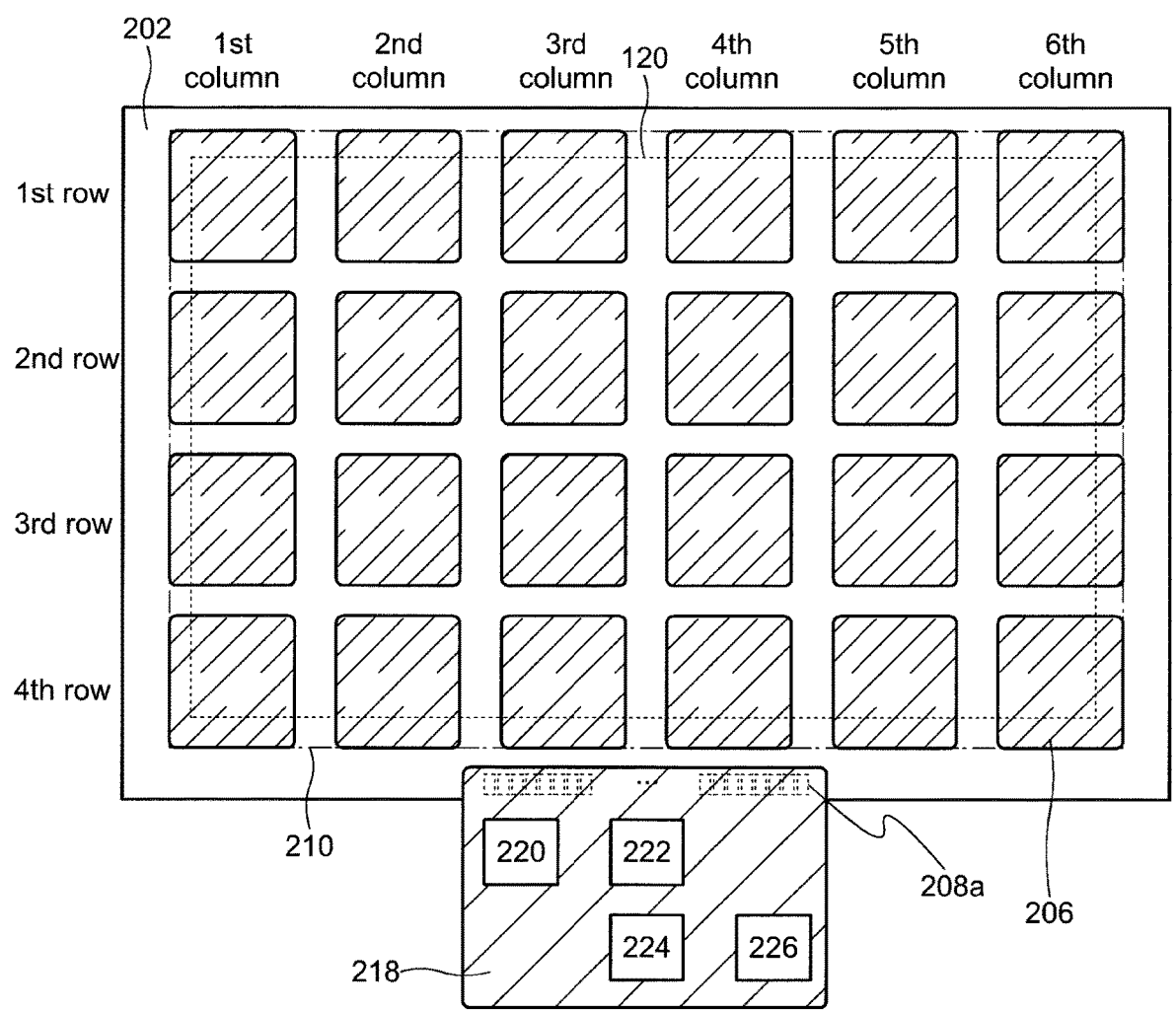
FIG. 2 is a schematic top view of a sensor module according to an embodiment of the present invention.

Specifically, the sensor module 200 has a sensor substrate 202 and a cover substrate 204 opposing the sensor substrate 202 where a plurality of sensor electrodes 206 is disposed between the sensor substrate 202 and the cover substrate 204 as shown in FIG. 1 and a schematic top view (FIG. 2). The plurality of sensor electrodes 206 is arranged in a plurality of rows and a plurality of columns. In the example demonstrated in FIG. 2, the sensor electrodes 206 arranged in a matrix form having 4 rows and 6 columns are disposed in the sensor module 200. The number and size of the sensor electrodes 206 may be appropriately determined according to the size of the display device 100 and detection accuracy required by the sensor module 200. Here, a minimum rectangular region surrounding all of the sensor electrodes 206 is referred to as a sensor region 210, while a region surrounding the sensor region 210 is referred to as a sensor frame region.

The sensor substrate 202 and the cover substrate 204 are structured by a material capable of transmitting visible light to allow the image displayed by the display module 110 to be viewed. Hence, the sensor substrate 202 and the cover substrate 204 are structured with glass, quartz, a polymer material such as a polyimide, a polyamide, and a polycarbonate, or the like.

Each of the sensor electrodes 206 overlaps the plurality of pixels 116 and is arranged to overlap at least a part of the display region 120. For example, the sensor electrodes 206 are arranged so that the sensor region 210 shown by the chain line overlaps the whole of the display region 120 as shown in FIG. 2. Although not illustrated, the sensor region 210 and the display region 120 may have the same shape. Alternatively, the sensor region 210 may be smaller than the display region 120. In this case, the sensor electrodes 206 are arranged so that the whole of the sensor region 210 overlaps the display region 120.

The sensor electrode 206 includes a conductive oxide transmitting visible light such as indium-tin oxide (ITO) and indium-zinc oxide (IZO) or a metal (0 valent metal) such as molybdenum, tungsten, tantalum, aluminum, and copper. The sensor electrode 206 may have a single-layer structure or a stacked-layer structure. For example, the sensor electrode 206 may have a structure in which a layer including a conductive oxide and a layer including a metal are stacked. As described below, a sensor wiring is provided to each sensor electrode 206. That is, a plurality of sensor wirings respectively corresponding to the plurality of sensor electrodes 206 is disposed over the sensor substrate 202. Each sensor wiring is exposed over the sensor substrate 202 to form a terminal 208a.

A first connector 218 such as an FPC substrate is electrically connected to the terminals 208a, and the first connector 218 is connected to an external circuit which is not illustrated. A power circuit 220, a detector 222, a processing element 224, an interface 226, and the like may be arranged over the first connector 218. The power circuit 220 converts power supplied from the external circuit to a pulse alternating voltage and supplies the alternating voltage to each sensor electrode 206 through the terminals 208a and the sensor wirings. The detector 222, which is also called an analog front end (AFE), detects a variation in capacitance of the sensor electrodes 206 as a potential fluctuation, and digitizes the potential fluctuation to generate a detection signal. The detection signals generated by the detector 222 are input to the processing element 224, and the coordinates representing the position of the input means are generated by the processing element 224 according to the detection signals. The detector 222 and the processing element 224 may be formed as a single integrated circuit (IC) chip. The interface 226 is used for the connection with the external circuit and is configured according to the regulation such as the Universal Serial Bus (USB) and the Serial Peripheral Interface (SPI).

3-2. Arrangement of Each Component

Figure 3:
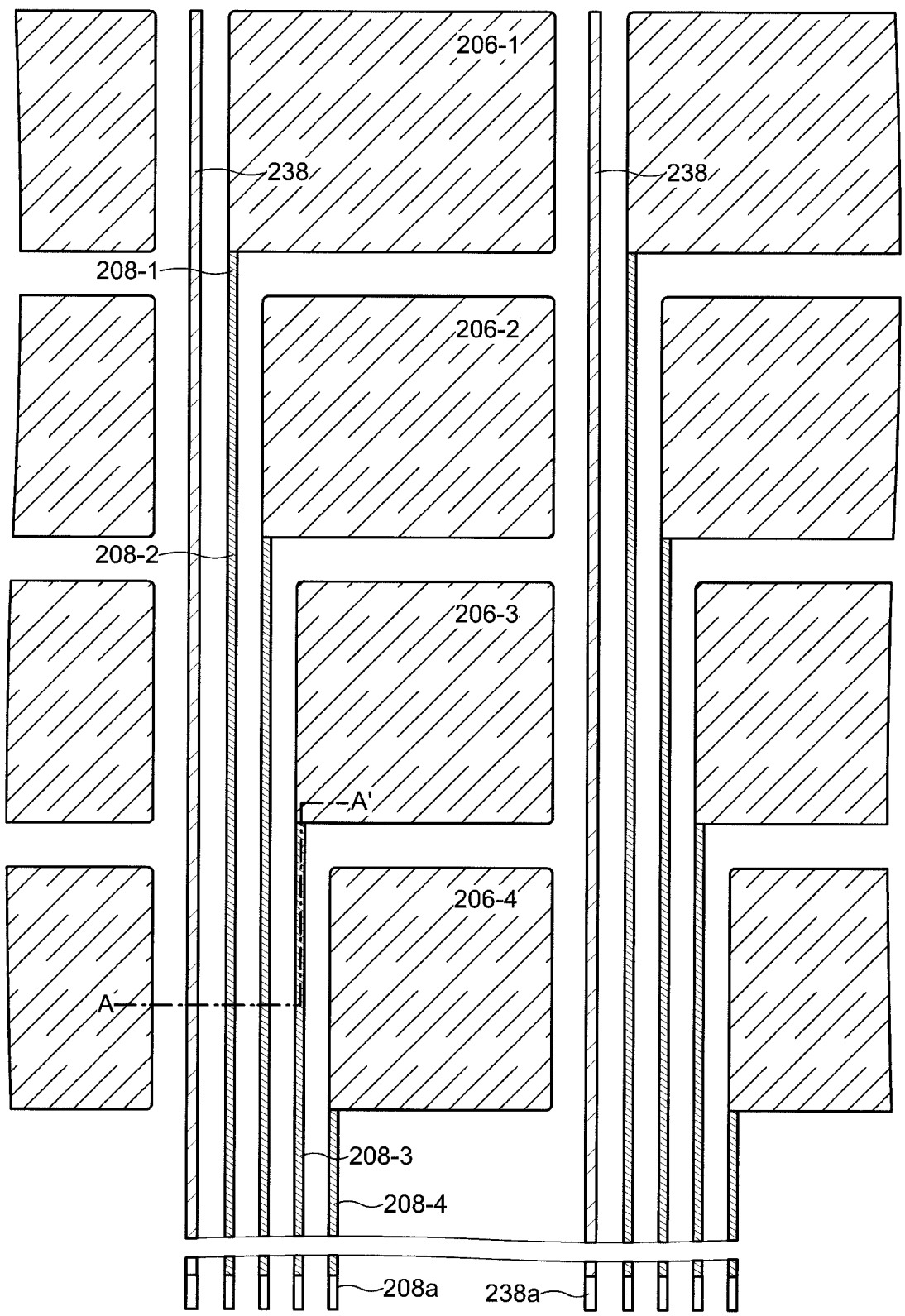
FIG. 3 is a schematic top view of a sensor module according to an embodiment of the present invention.

A schematic extended top view of a part of the sensor module 200 is shown in FIG. 3. As shown in this drawing, each sensor electrode 206 is provided with the corresponding sensor wiring 208. That is, the sensor module 200 is provided with the same number of sensor wirings 208 as the sensor electrodes 206, and one sensor wiring 208 is electrically connected to one sensor electrode 206. With this structure, the sensor electrodes 206 are electrically connected to the terminals 208a. In addition, each sensor wiring 208 connects the corresponding sensor electrode 206 to the corresponding terminal 208a without passing through any other sensor electrode 206. In other words, one sensor wiring 208 is not connected to the plurality of sensor electrodes 206, and, in a similar way, one sensor electrode 206 is not connected to the plurality of sensor wirings 208. In the example shown in FIG. 3, the sensor wirings 208-1 to 208-4 respectively correspond to and are electrically connected to the sensor electrodes 206-1 to 206-4, respectively.

As described above, the sensor electrodes 206 are applied with a pulse alternating voltage of the same phase through the sensor wirings 208. When the input means approaches the sensor electrodes 206, virtual capacitor elements are formed between the input means and the sensor electrodes 206, and the potential of each sensor electrode 206 is accordingly fluctuated. This potential fluctuation is detected and digitized by the detector 222, and the coordinates of the position to which the input means comes close are identified in the processing element 224 on the basis of the amount of the potential fluctuation and the position (coordinates) of each sensor electrode 206. Thus, the sensor module 200 functions as an electrostatic capacitive type (self-capacity type) and non-contact type sensor (hover sensor).

A shield wiring 238 may be arranged as an optional component in the sensor module 200. Specifically, one or a plurality of shield wirings 238 extending in the column direction as a whole and crossing a plurality of rows may be arranged in the sensor module 200 as shown in FIG. 3. Each shield wiring 238 is spaced away from the sensor electrodes 206. When a plurality of shield wirings 238 is provided, the same number of shield wirings 238 as the columns may be arranged so that the sensor electrodes 206 and the shield wirings 238 alternate in each row, for example. Each shield wiring 238 is exposed at a vicinity of the edge portion of the sensor substrate 202 to form a terminal 238a. The terminal 238a is arranged along a side of the sensor region 210 along which the terminals 208a of the sensor wirings 208 are arranged. The pulse alternating voltage of the same phase as the sensor electrodes 206 is applied to the shield wirings 238 from the power circuit 220 through the terminals 238a. The shield wirings 238 may not be connected to the detector 222 because the shield wirings 238 do not need to contribute to the determination of the coordinates of the input means. The arrangement of the shield wirings 238 allows the shield wirings 238 to each exist between the sensor wiring 208 and the sensor electrodes 206 arranged in the adjacent column, thereby decreasing the influence of the potential fluctuation of the sensor electrodes 206 in the adjacent column. As a result, the coordinates of the input means can be more accurately identified.

Figure 4A:
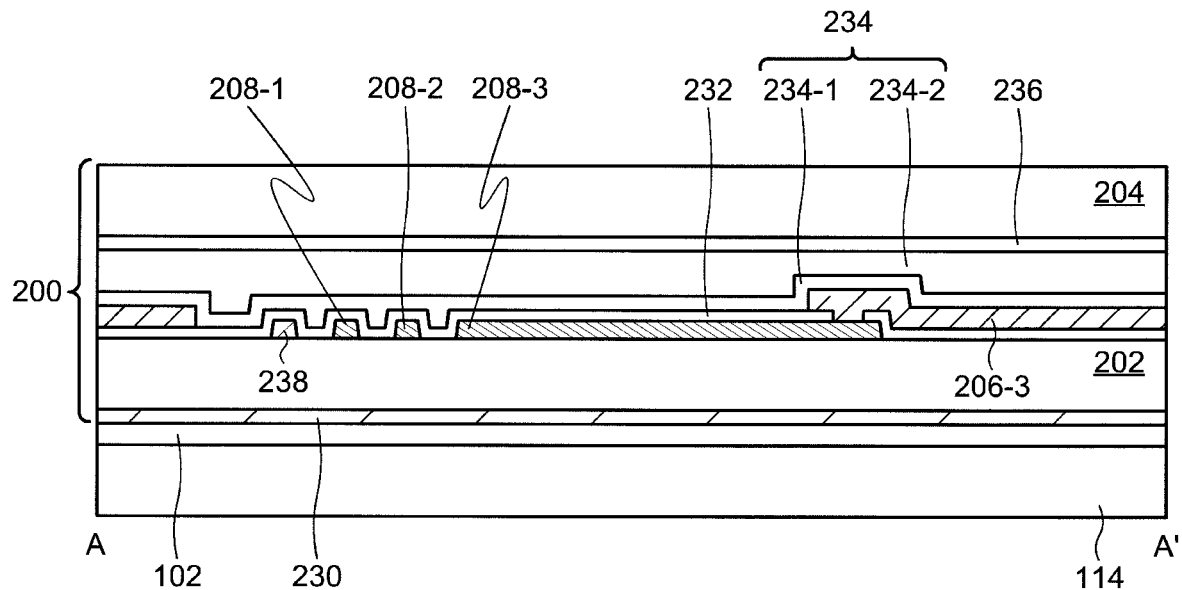
FIG. 4A is a schematic cross-sectional view of a sensor module according to an embodiment of the present invention.

A schematic view of a cross-section along the chain line A-A' in FIG. 3 is shown in FIG. 4A. The counter substrate 114 of the display module 110 is also depicted in FIG. 4A. As shown in FIG. 4A, the display module 110 and the sensor module 200 are fixed to each other with an adhesive layer 102 transmitting visible light. Note that, when the display module 110 is a liquid crystal display device, a polarizing plate and the like are disposed over the counter substrate 114.

As an optional component, a noise-shielding layer 230 may be arranged between the sensor substrate 202 and the counter substrate 114 to shield any electrical influence from the display module 110. The noise-shielding layer 230 may be provided over or under the adhesive layer 102. The noise-shielding layer 230 includes a light-transmitting oxide having conductivity such as ITO and IZO or a metal. In the latter case, a mesh metal film having a plurality of openings may be used as the noise-shielding layer 230 to allow visible light to pass therethrough. The noise-shielding layer 230 is disposed to overlap the plurality of sensor electrodes 206. A second connector 216 such as an FPC substrate is electrically connected to the noise-shielding layer 230 (see FIG. 1), and a pulse alternating voltage of the same phase as the potential applied to the sensor electrodes 206 is applied to the noise-shielding layer 230. Hence, the noise-shielding layer 230 is always equipotential with the sensor electrodes 206.

Figure 4B:
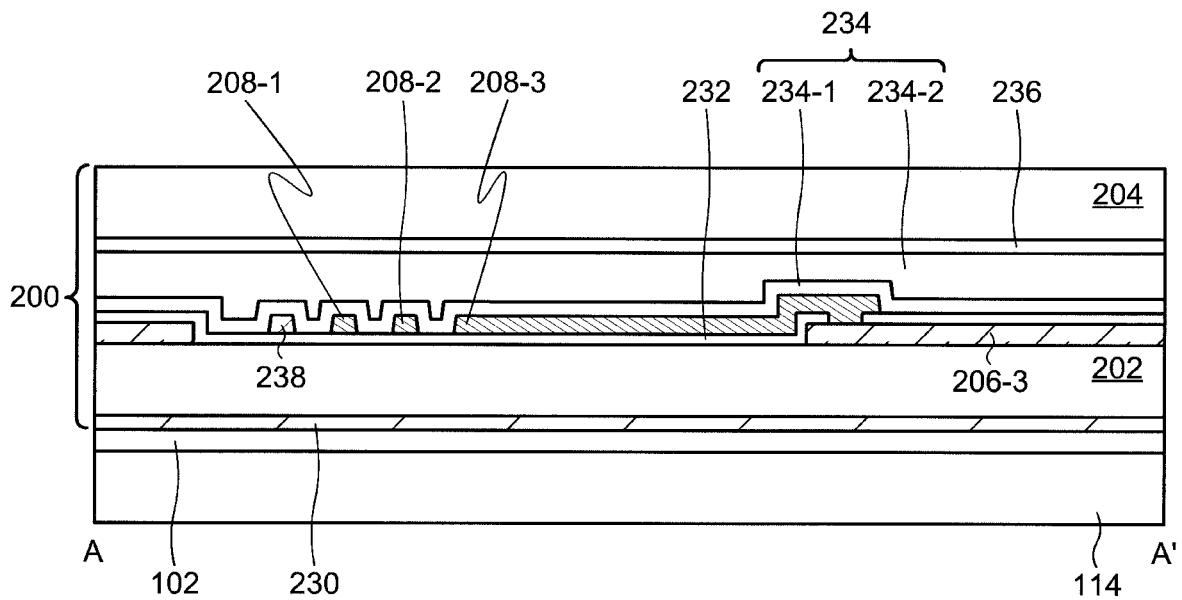
FIG. 4B is a schematic cross-sectional view of a sensor module according to an embodiment of the present invention.

The sensor wirings 208 and the shield wirings 238 are disposed over the sensor substrate 202 directly or through an insulating undercoat which is not illustrated, over which the sensor electrodes 206 are arranged. Here, the sensor electrodes 206 may be directly disposed over the sensor wirings 208 or may be arranged through an interlayer insulating film 232 including a silicon-containing inorganic compound such as silicon oxide and silicon nitride as shown in FIG. 4A. In the latter case, the sensor electrodes 206 and the sensor wirings 208 are electrically connected through openings formed in the interlayer insulating film 232. Note that there is no limitation to the vertical relationship between the sensor electrodes 206 and the sensor wirings 208, and the sensor wirings 208 may be arranged over the sensor electrode 206 as shown in FIG. 4B. The shield wirings 238 may exist in the same layer as the sensor wirings 208 or the sensor electrodes 206 although are not illustrated.

Figure 5:
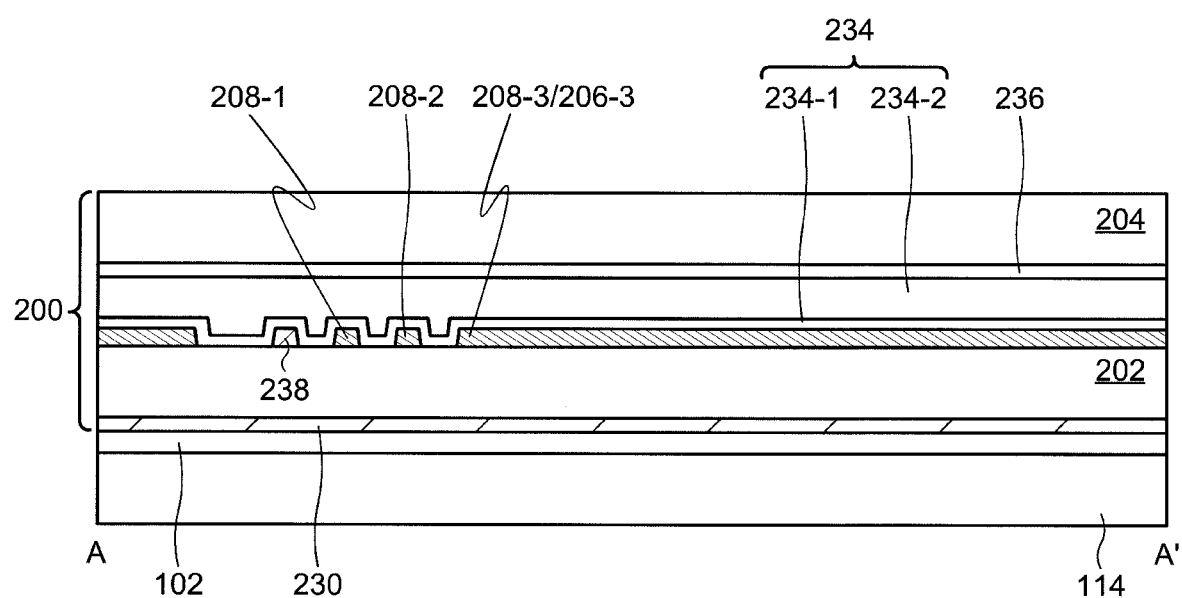
FIG. 5 is a schematic cross-sectional view of a sensor module according to an embodiment of the present invention.

Alternatively, the sensor electrodes 206, the sensor wirings 208, and the shield wirings 238 may be formed so as to exist in the same layer as shown in FIG. 5. That is, the sensor electrodes 206 and the sensor wirings 208 having the same composition may be simultaneously formed in the same process. In this case, the sensor electrodes 206 and the sensor wirings 208 are preferred to include a metal in order to avoid an increase in resistance and may have a stacked structure of a film including a light-transmitting oxide having conductivity and a film including a metal.

Figure 6:
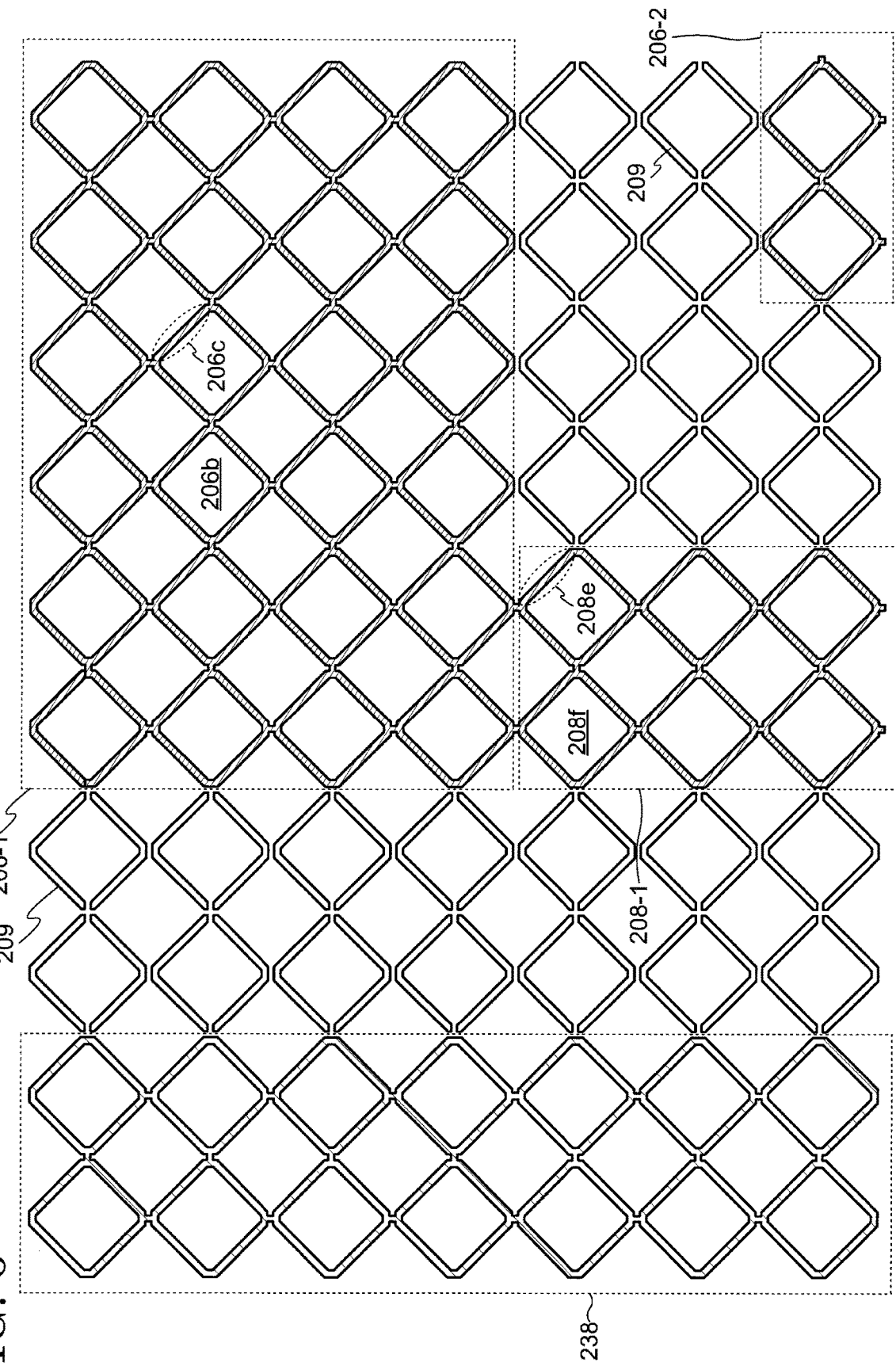
FIG. 6 is a schematic top view of a sensor module according to an embodiment of the present invention.

When the sensor electrodes 206 include a metal, it is preferred that the sensor electrodes 206 be formed in a mesh shape in order to prevent any influence on the image displayed by the display module 110. When the sensor electrodes 206 have a stacked structure of a film including a light-transmitting oxide having conductivity and a film including a metal, both films or the latter film may be formed in a mesh shape. Specifically, each sensor electrode 206 is formed in a mesh shape so as to have a plurality of openings 206b formed by frames 206c as shown in FIG. 6 which is an enlarged view of a part of FIG. 5, allowing the image to be viewed through the openings 206b. With this structure, sufficient conductivity can be secured in the sensor electrodes 206 and the image from the display module 110 can be viewed. Furthermore, the sensor wirings 208 may also be configured to have a mesh shape as shown in FIG. 6. It is preferred that the mesh patterns of the sensor electrodes 206 and the sensor wirings 208 be the same or substantially the same as each other. Namely, a width of the frames 206c structuring the mesh of the sensor electrode 206 is preferred to be the same or substantially the same as a width of the frames 228e structuring the mesh shape of the sensor wiring 208. In a similar way, it is preferred that the shape, size, and pitch of the openings 206b of the mesh of the sensor electrode 206 be respectively the same or substantially the same as the shape, size, and pitch of the openings 208f of the mesh of the sensor wiring 208. Similarly, the shield wirings 238 may also be configured to have a mesh shape the same as those of the sensor electrodes 206 and the sensor wirings 208. Generation of moire can be prevented by providing the sensor wirings 208 and the shield wirings 238 with the same mesh shape as that of the sensor electrodes 206.

In addition, it is preferred to arrange a plurality of dummy electrodes 209 existing in the same layer as the sensor electrodes 206 and the sensor wirings 208 between the adjacent sensor electrodes 206, between the sensor electrode 206 and the sensor wiring 208, and between the sensor electrodes 206 and the shield wiring 238 as shown in FIG. 6. The plurality of dummy electrodes 209 are not connected to each other and are electrically insulated from the sensor electrodes 206, the sensor wirings 208, and the shield wirings 238 to exist in an electrically floating state. It is preferred that the plurality of dummy electrodes 209 have the same or substantially the same width as the frame 206c and the frame 208e and that a direction in which at least a part of each dummy electrode 209 extends be parallel to a part of the frames 206c and a part of the frames 208e. Moreover, the pitch of the plurality of dummy electrodes 209 is preferred to be the same or substantially the same as the pitches of the openings 206b and 208f. Generation of moire can be effectively prevented because a substantially even optical property can be obtained along the whole of the sensor region 210 in the layers in which the sensor electrodes 206 and the sensor wirings 208 are formed. Note that, although the hatchings provided to the sensor electrodes 206, the sensor wiring 208, the shield wiring 238, and the dummy electrodes 209 are different from one another, these components may have the same composition and the same layer structure. Moreover, the dummy electrode 209 shown in FIG. 6 is bent to have a doglegged shape, and the dummy electrode 209 may be further divided at the bent portion. Furthermore, in addition to such a shape, it is also possible to employ a structure in which a narrow line forming the dummy electrode 209 is divided at its middle portion.

As can be understood from FIG. 3, FIG. 4A, and FIG. 4B, each sensor wiring 208 is arranged so as not to overlap at least all of the sensor electrodes 206 other than the sensor electrode 206 connected to the sensor wiring 208. In other words, each sensor wiring 208 is arranged so as to be entirely exposed from at least all of the sensor electrodes 206 other than the sensor electrode 206 connected to the sensor wiring 208. Alternatively, each sensor wiring 208 is arranged so as not to overlap all of the sensor electrodes 206 including the sensor electrode 206 connected to the sensor wiring 208 as can be understood from FIG. 3 and FIG. 5. In other words, each sensor wiring 208 is entirely exposed from all of the sensor electrodes 206 including the sensor electrode 206 connected to the sensor wiring 208. These configurations and arrangements of the sensor electrodes 206 and the sensor wirings 208 prevent the formation of a capacitance (parasitic capacitance) between the sensor wirings 208 and the sensor electrodes 206. Thus, when the input means approaches the sensor electrode 206-1 to cause a fluctuation of the potential of the sensor wiring 208-1, this potential fluctuation does not influence other sensor electrodes 206. As a result, the detection signal of the sensor electrode 206-1 is not dispersed to other sensor electrodes 206, and the detection position (coordinates) of the input means can be accurately identified.

A protection film 234 may be disposed over the sensor wirings 224 and the sensor electrodes 206 as an optional component (see FIG. 4A to FIG. 5). The protection film 234 has a single-layer or stacked-layer structure and is structured by a film including a silicon-containing inorganic compound, a resin such as an epoxy resin, an acrylic resin, and a silicone resin, or the like. In FIG. 4A to FIG. 5, the protection film 234 in which a first protection film 234-1 including an inorganic compound and a second protection film 234-2 including a resin are stacked is illustratively demonstrated. The stacking order of the first protection film 234-1 and the second protection film 234-2 is not limited, and the first protection film 234-1 may be stacked over the second protection film 234-2. The first protection film 234-1 including a resin also functions as a planarization film. The cover substrate 204 is fixed over the protection film 234 via an adhesive layer 236 transmitting visible light.

3-3. Resistance Adjustment (1) Resistance Adjustment by Sensor Wiring

As described above, the terminals 208a of the sensor wirings 208 are arranged along a side of the sensor region 210 over the sensor frame region because they are connected to the first connector 218 (see FIG. 2 and FIG. 3). Thus, the distance from the sensor electrode 206 to the terminal 208a varies depending on the position of the sensor electrode 206. More specifically, when focus is placed on one column, the sensor wiring 208-1 connected to the sensor electrode 206-1 farthest from the terminal 208a is the longest, while the sensor wiring 208-4 connected to the sensor electrode 206-4 closest to the terminal 208a is shortest. Hence, the resistance of the sensor wiring 208 varies every row in each column. Accordingly, the time constant of the sensor electrode 206 functioning as a sensor varies depending on the row (that is, the distance between the terminal 208a and the sensor electrode 206. The same is applied hereinafter.), and the detection sensitivity to the input means varies depending on the row or the distance between the terminal 208a and the sensor electrode 206.

Figure 7A:
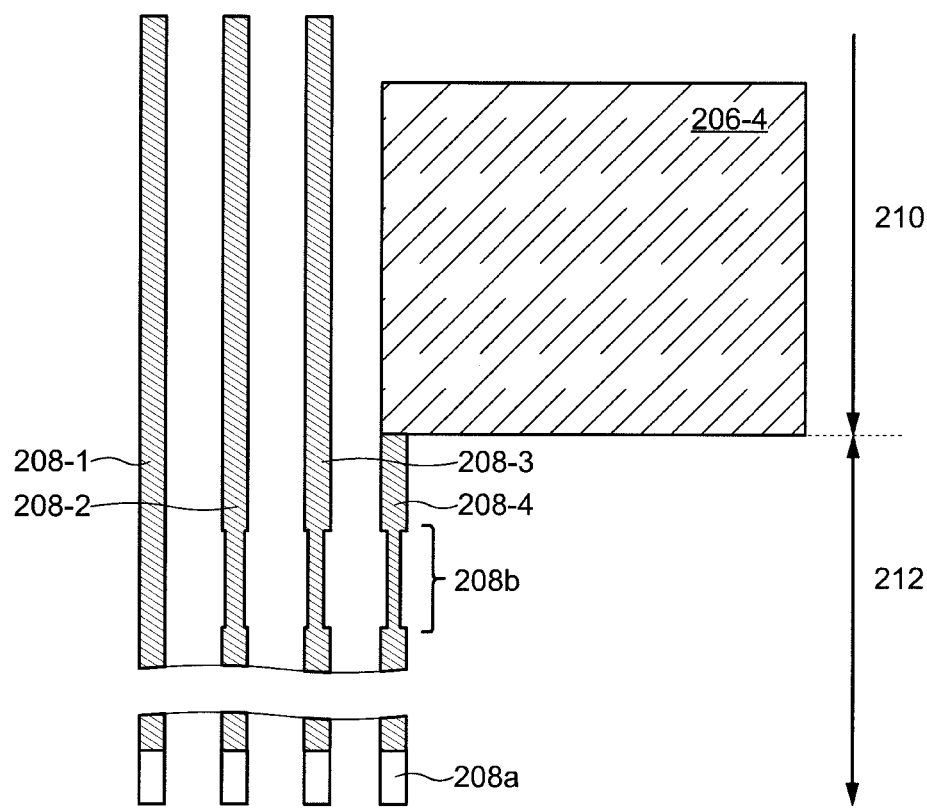
FIG. 7A is a schematic top view of a sensor module according to an embodiment of the present invention.

Therefore, a resistance-adjusting portion 208b is formed in the sensor wiring 208 in the sensor module 200 in order to suppress this detection sensitivity variation. Specifically, the resistance-adjusting portion 208b is formed in at least one of the plurality of sensor wirings 208 as shown in FIG. 7A. In the sensor wiring 208 provided with the resistance-adjusting portion 208b, a resistance of the resistance-adjusting portion 208b is higher than another portion. The resistance of the sensor wiring 208 increases proportionally to length if the material, thickness, and width are the same. Hence, the resistance-adjusting portion 208b is formed so that the resistance-adjusting portion 208b of the sensor wiring (here, the sensor wiring 208-4) connected to the sensor electrode 206 closest to the terminal 208a has the largest resistance and the resistance-adjusting portion 208b of the sensor wiring 208 connected to the sensor electrode 206 with a larger distance from the terminal 208a decreases in order to adjust the resistances of the sensor wirings 208 to be the same or substantially the same. In other words, the resistance-adjusting portion 208b is formed so that the resistance of the resistance-adjusting portion 208b of the sensor wiring 208 decreases with increasing length of the sensor wiring 208. With this structure, the resistances of the plurality of sensor wirings 208 can be adjusted to be the same or substantially the same in each column.

For example, the resistance-adjusting portions 208b may be formed so that the resistances thereof increase in the order of the sensor wirings 208-2, 208-3, and 208-4 which are respectively connected to the sensor electrodes 206-2, 206-3, and 206-4 respectively arranged in the second row, the third row, and the fourth row, without providing the resistance-adjusting portion 208b to the longest sensor wiring 208-1. Alternatively, the resistance-adjusting portion 208b may be formed in the longest sensor wiring 208-1 although is not illustrated. In this case, the resistance-adjusting portions 208b are formed so that the resistances thereof increase in the order of the sensor wirings 208-1, 208-2, 208-3, and 208-4 which are respectively connected to the sensor electrodes 206-1, 206-2, 206-3, and 206-4 respectively arranged in the first row, the second row, the third row, and the fourth row.

Figure 7B:
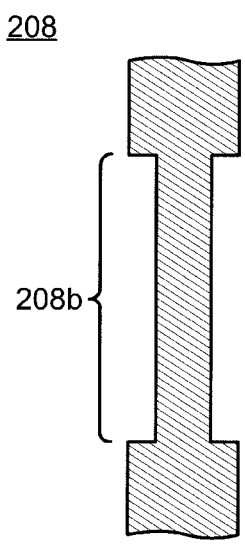
FIG. 7B is a schematic top view of a sensor module according to an embodiment of the present invention.
Figure 8A:
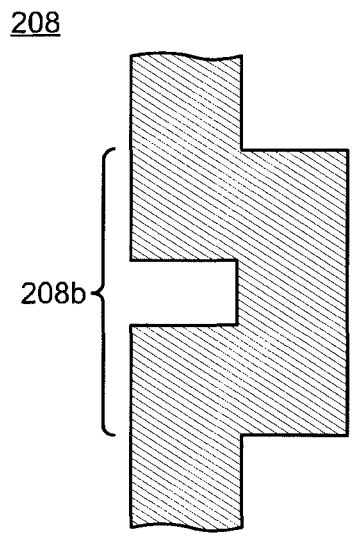
FIG. 8A is a schematic top view of a sensor module according to an embodiment of the present invention.
Figure 8B:
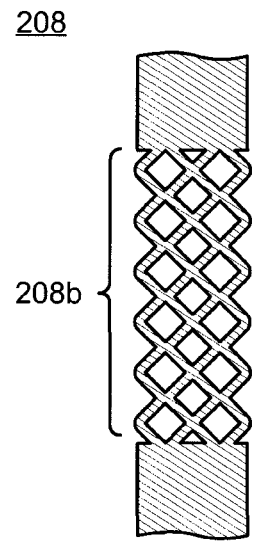
FIG. 8B is a schematic top view of a sensor module according to an embodiment of the present invention.
Figure 8C:
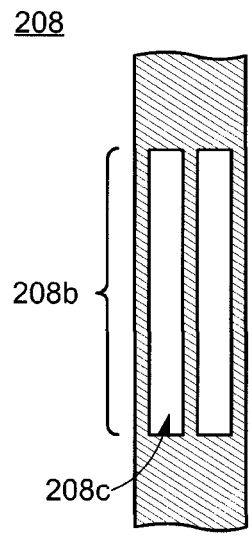
FIG. 8C is a schematic top view of a sensor module according to an embodiment of the present invention.
Figure 8D:
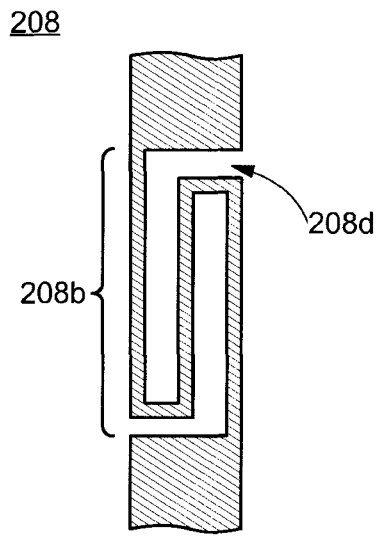
FIG. 8D is a schematic top view of a sensor module according to an embodiment of the present invention.
Figure 8E:
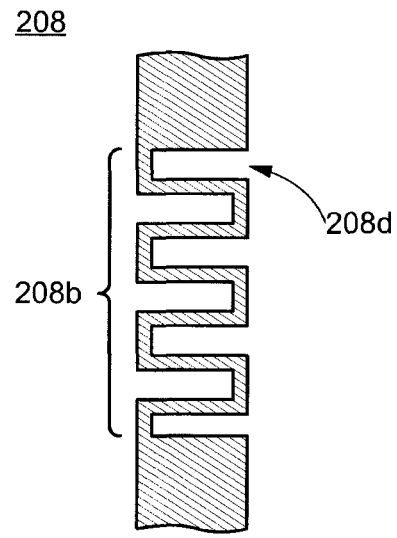
FIG. 8E is a schematic top view of a sensor module according to an embodiment of the present invention.
Figure 8F:
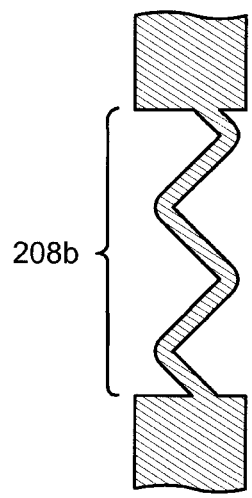
FIG. 8F is a schematic top view of a sensor module according to an embodiment of the present invention.

The resistance-adjusting portion 208b may be formed by adjusting the shape of the sensor wiring 208. For example, the resistance-adjusting portion 208b may be formed by setting the width thereof (a length in a direction perpendicular to the direction in which the sensor wiring 208 extends) to be smaller than a width of another portion as shown in FIG. 7B. Alternatively, the sensor wiring 208 may be bent to use this bent portion as the resistance-adjusting portion 208b, where the widths of the sensor wiring 208 and the resistance-adjusting portion 208b are the same as shown in FIG. 8A. Alternatively, a mesh shape may be formed in a part of the sensor wiring 208 to use this portion as the resistance-adjusting portion 208b (FIG. 8B). Since an area per unit length decreases in the mesh portion, the resistance can be increased compared with another portion. The shape to decrease the area per unit length is not limited to a mesh shape and may be a slit 208c shown in FIG. 8C or a cutoff 208d shown in FIG. 8D and FIG. 8E. An extending direction of the cutoff 208d may have an arbitral angle with respect to the extending direction of the sensor wiring 208, and the cutoff 208d may be bent. Alternatively, a zig-zag form may be provided to the sensor wiring 208 to use this portion as the resistance-adjusting portion 208b (FIG. 8F). Here, a slit is an opening having a closed shape, while a cutoff is an opening having an open shape. A closed shape is a shape whose outline defining this shape does not have a terminal and provides at least one closed plane. On the other hand, an open shape is a shape whose outline defining this shape has at least two terminals.

(2) Resistance Adjustment by Sensor Electrode

Figure 9:
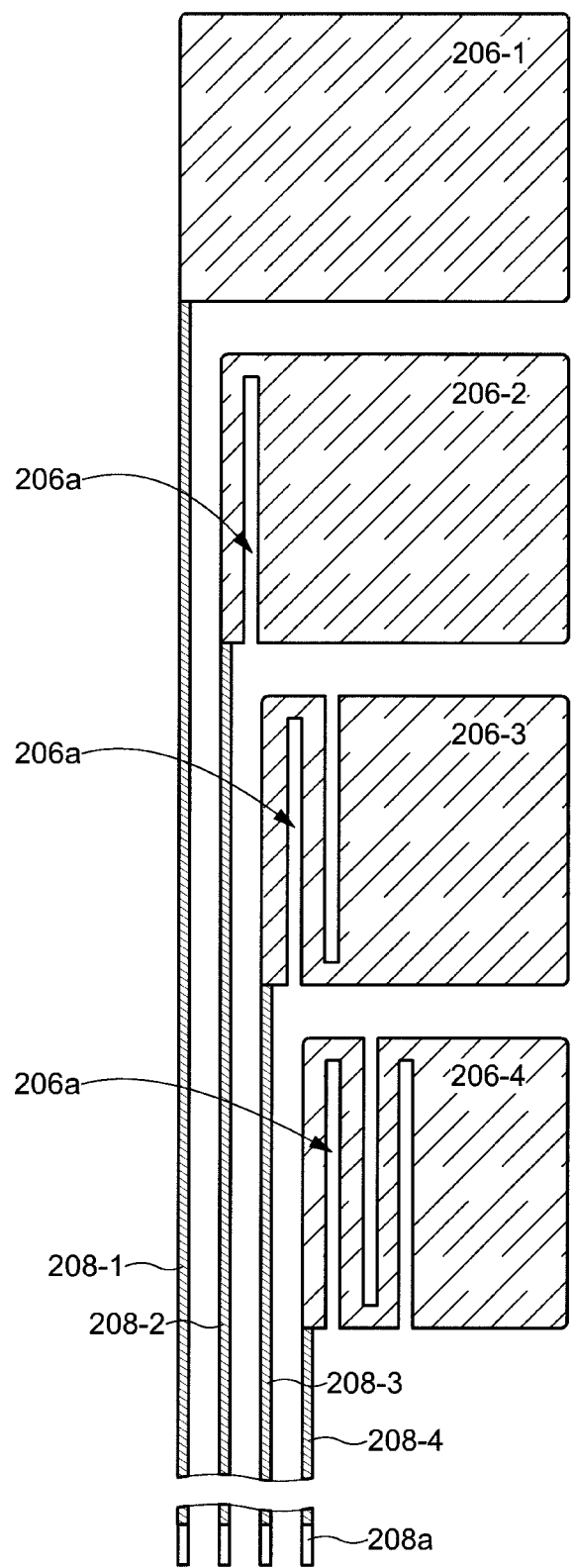
FIG. 9 is a schematic top view of a sensor module according to an embodiment of the present invention.
Figure 10:
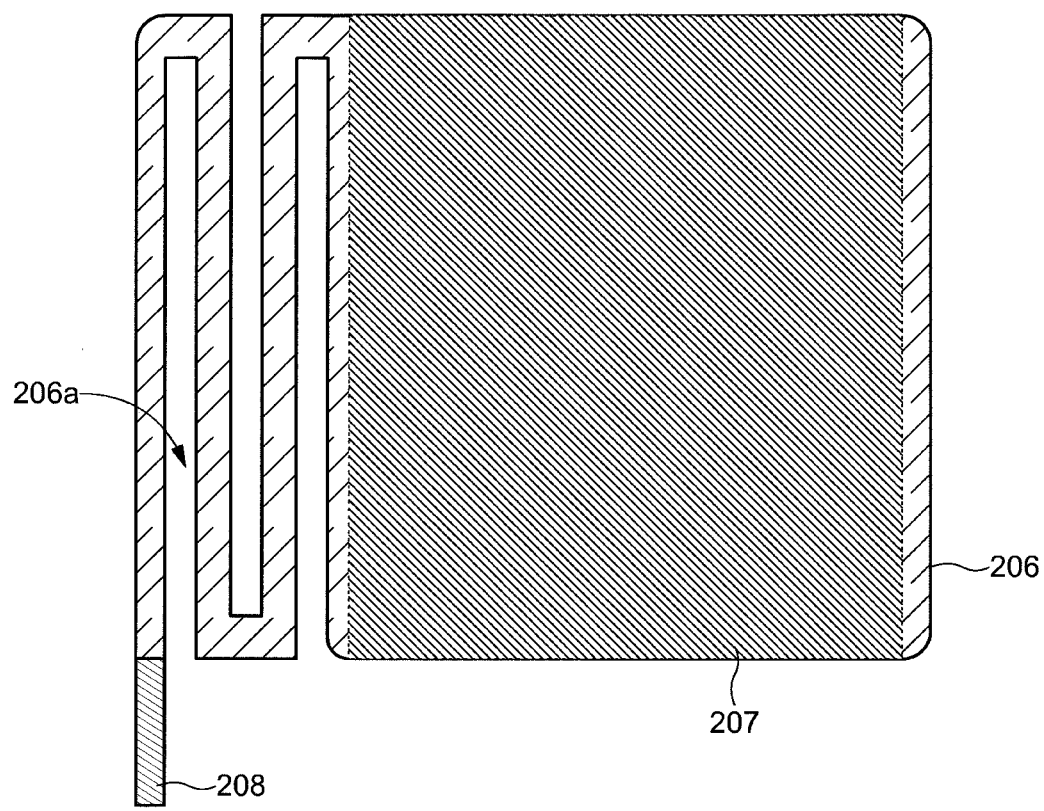
FIG. 10 is a schematic top view of a sensor module according to an embodiment of the present invention.

The resistance adjustment may be performed using the sensor electrode 206 instead of or together with the aforementioned resistance adjustment using the sensor wiring 208. Specifically, the resistance adjustment may be performed by providing at least one or a plurality of linear or bent cutoffs 206a to the sensor electrode 206 so that a resistance is additionally generated in the sensor electrode 206 as shown in FIG. 9. Here, when a virtual rectangle 207 entirely overlapping the sensor electrode 206 in a plane view, circumscribing the sensor electrode 206, and formed by two sides parallel in the row direction and two sides parallel to the column direction is considered, the cutoff 206a is defined as an opening having an open shape and formed in a region between the rectangle 207 and the sensor wiring 208 (FIG. 10).

The cutoff 206a is formed in order to adjust a summation (hereinafter, referred to as a total resistance) of a resistance of a portion of the sensor electrode 206 other than the portion functioning as a sensor (that is, a portion overlapping the virtual rectangle 207 and a portion other than the virtual rectangle and unconnected to the sensor wiring 208) and the resistance of the sensor wiring 208 to be the same or substantially the same between the sensor electrodes 206. Hence, the number, length, and width of the cutoff 206a (that is, the area of the cutoff 206a) may be adjusted so that the total resistances increase in the order of the sensor electrodes 206-2, 206-3, and 206-4 respectively arranged in the second row, the third row, and the fourth row, which are closer to the terminals 208a, without forming the cutoff 206a in the sensor electrode 206-1 having the largest distance from the terminal 208a as shown in FIG. 9, for example. Alternatively, although not illustrated, all of the sensor electrodes 206 may be provided with the cutoff 206a in each column, and the areas of the cutoffs 206a may be adjusted so that the total resistances increase with decreasing distance from the terminals 208a (that is, in the order of the first row, the second row, the third row, and the fourth row).

Figure 11:
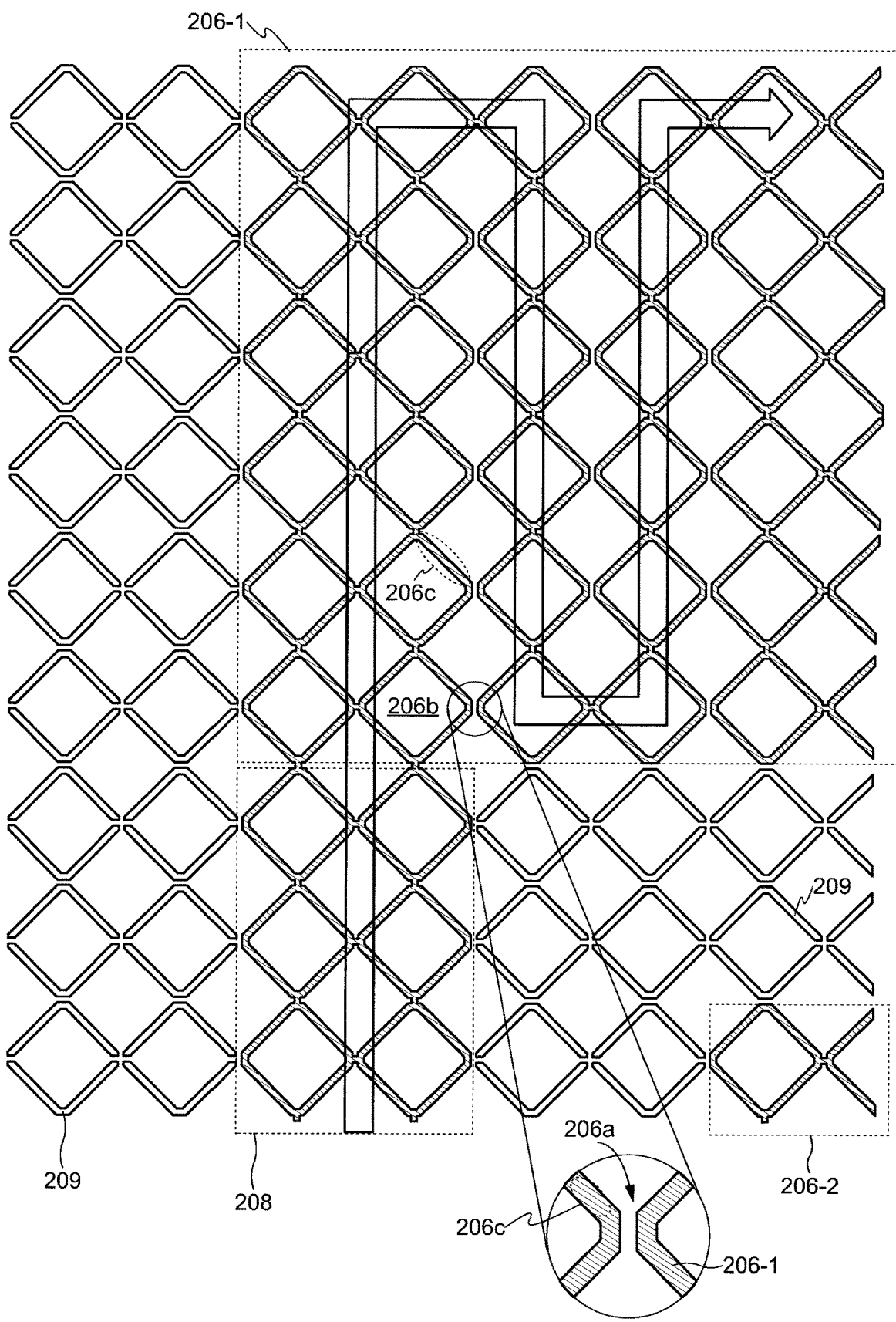
FIG. 11 is a schematic top view of a sensor module according to an embodiment of the present invention.

When the sensor electrode 206 and the sensor wiring 208 have the mesh shape, the cutoff 206a may be formed as gaps cutting and insulating the frames 206c between the openings 206b, which are adjacent in a direction perpendicular to the extending direction of the cutoff 206a, as shown in FIG. 11 (see the enlarged view in FIG. 11). With this structure, a bent conductive path with a narrow width is formed to increase the total resistance as shown by the arrow in FIG. 11.

Figure 12:
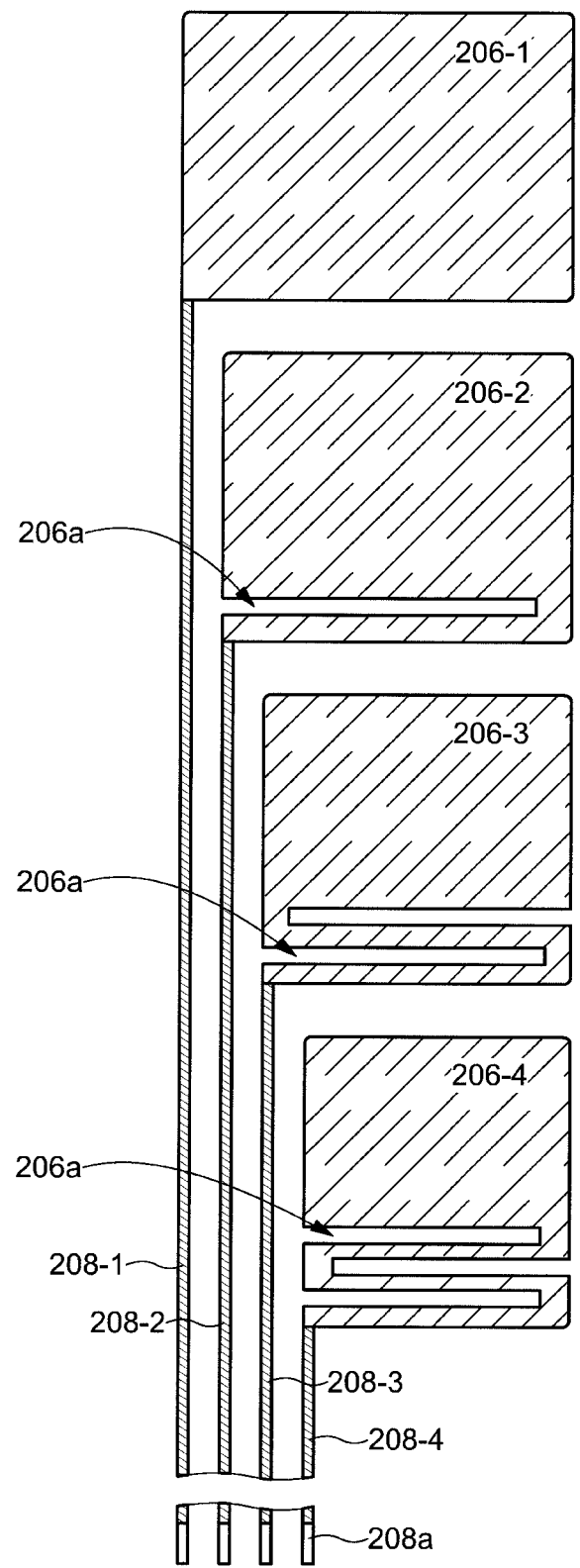
FIG. 12 is a schematic top view of a sensor module according to an embodiment of the present invention.

There is no limitation to the shape of the cutoff 206a, and the cutoff 206a may be formed so as to extend in the row direction (FIG. 12). Although not illustrated, a slit may be formed instead of or together with the cutoff 206a.

Note that when the sensor electrodes 206 and the sensor wirings 208 exist in the same layer, the interface therebetween may not be clearly defined because the compositions of the sensor electrodes 206 and the sensor wirings 208 are the same. In this case, a portion of the sensor electrode 206 other than the virtual rectangle 207 and connected to the sensor wiring 208 may be recognized as a portion of the sensor electrode 206 or as the aforementioned resistance-adjusting portion 208b.

4. MODIFIED EXAMPLE

The structure of the sensor module 200 is not limited to the aforementioned structure, and a variety of structures may be employed. Hereinafter, several modified examples are explained. Although the examples in which the resistance-adjusting portion 208b is provided to the sensor wiring 208 are mainly explained in the following description, the row-dependence of the time constant may be suppressed or canceled by forming the cutoff 206a in the sensor electrode 206 instead of or together with the resistance-adjusting portion 208b.

(1) Modified Example 1

In the example shown in FIG. 3, the sensor module 200 is configured so that the areas of the sensor electrodes 206 increase with increasing distance from the terminals 208a. It is possible to simplify the layout of the sensor wirings 208 and densely arrange the sensor electrodes 206 by employing this arrangement.

Figure 13:
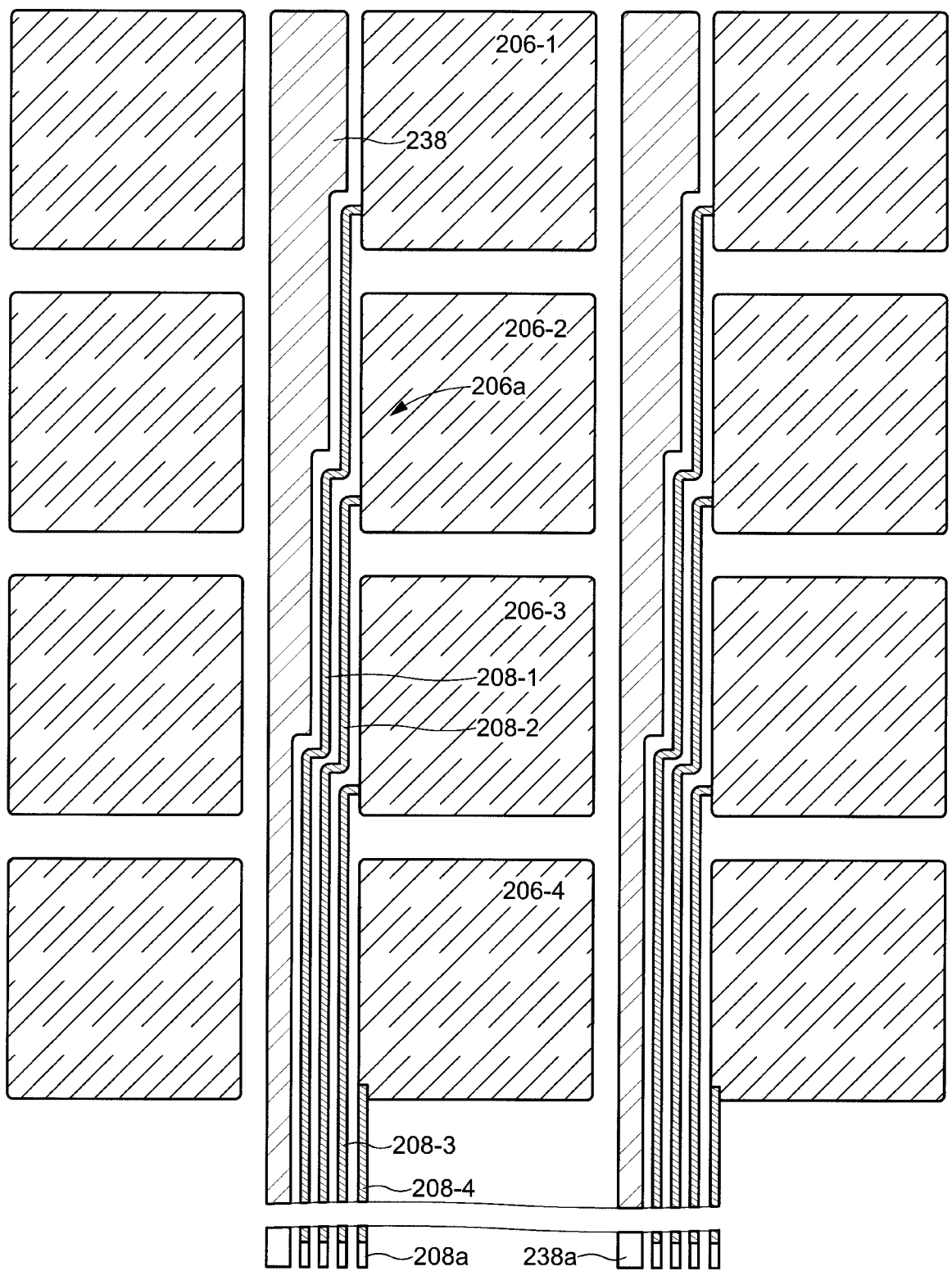
FIG. 13 is a schematic top view of a sensor module according to an embodiment of the present invention.

However, the structure of the sensor module 200 is not limited thereto, and the sensor module 200 may be configured so that all of the sensor electrodes 206 have the same shape and area as shown in FIG. 13. The formation of the sensor electrodes 206 having the same area results in a decrease in row dependence of the amount of potential fluctuation caused by the approach of the input means, by which the design of the resistance-adjusting portion 208b and the cutoff 206a is facilitated and the coordinates of the input means can be more accurately identified.

As can be understood from FIG. 13, the area occupied by the sensor wirings 208 between the sensor electrodes 206 adjacent in the row direction decreases with increasing distance from the terminals 208a in such an arrangement. Hence, when the shield wirings 238 are arranged, the shield wirings 238 may be configured so that the widths thereof (i.e., the lengths in the row direction) increase stepwise or continuously with increasing distance from the terminals 208a. Such an arrangement of the shield wirings 238 with variable widths in the row direction allows the electric field between the input means approaching between the adjacent sensor electrodes 206 and the sensor region 210 to be uniform without causing distortion, and a part of the electric filed overlapping the sensor electrodes 206 is detected as a capacitance variation, which enables the row-independent detection without variation.

(2) Modified Example 2

Figure 14:
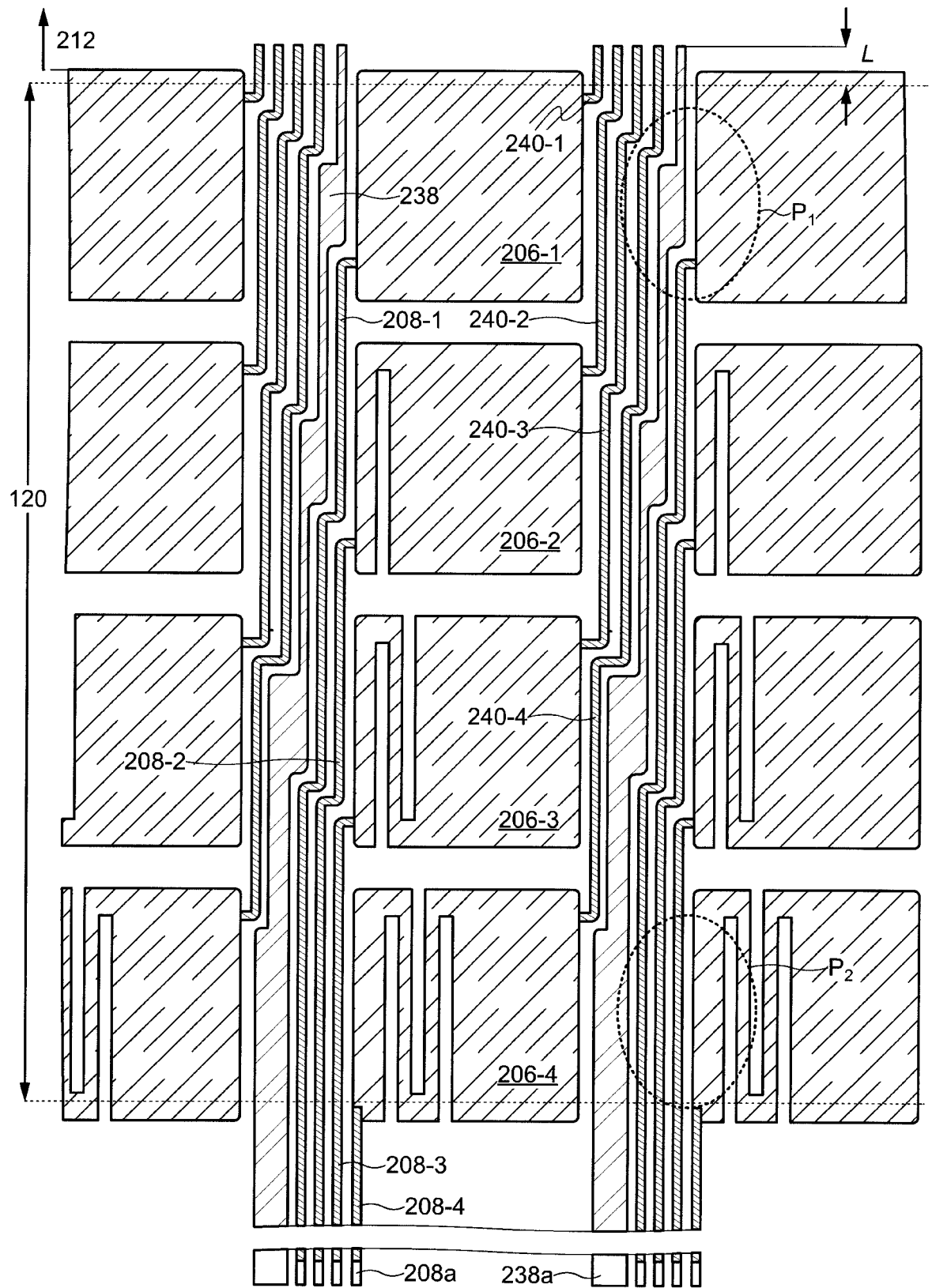
FIG. 14 is a schematic top view of a sensor module according to an embodiment of the present invention.

In the sensor module 200, an auxiliary wiring 240 different from the sensor wiring 208 may be provided to each sensor electrode 206 as shown in FIG. 14. Specifically, a plurality of auxiliary wirings 240 is respectively provided to the corresponding plurality of sensor electrodes 206. One auxiliary wiring 240 is selectively connected to one sensor electrode 206 and extends in the direction opposite to the terminal 208a. The auxiliary wiring 240 is not connected to other conductive components other than the sensor electrode 206 connected thereto. Hence, the pulse alternating voltage of the same phase as the sensor electrodes 206 is applied to the auxiliary wirings 240. Each auxiliary wiring 240 may be configured to include a light-transmitting oxide having conductivity or a metal. In the latter case, the formation of both of the sensor electrodes 206 and the auxiliary wirings 240 to have the mesh shape allows the images to be viewed through the sensor electrodes 206 and the auxiliary wirings 240 and also prevents the moire generation.

This arrangement of the auxiliary wirings 240 makes the wiring density, that is, the summation of the areas of the sensor wirings 208 and the auxiliary wirings 240 to be substantially constant in the column direction. Hence, when the input means approaches the position $P_2$ close to the terminals 208a, for example, not only does the largest potential fluctuation occur on the sensor electrode 206-4 in the fourth row, which is closest to its coordinates, but also a secondary potential fluctuation occurs on the sensor wirings 208 arranged close to the sensor electrode 206 in the fourth row and on the sensor electrodes 206 arranged in the first to third rows and connected thereto. In a similar way, when the input means approaches the position $P_1$ far from the terminals 208a, not only does the potential fluctuation occur on the sensor electrode 206 arranged in the first row and close to its coordinates, but also a secondary potential fluctuation occurs on the auxiliary wirings 240 connected to the sensor electrodes in the second to fourth rows, which eventually causes a secondary potential fluctuation on the sensor electrodes 206 in the second to fourth rows. That is, while sensing the large potential fluctuation on the sensor electrode 206 to which the input means comes close, substantially the same secondary potential fluctuation can be generated on other sensor electrodes 206 of the column in which this sensor electrode 206 is arranged, regardless of the coordinates of the input means. As a result, the dependence of the secondary potential fluctuation on the coordinates of the input means is canceled, by which the coordinates of the input means can be accurately identified even when the input means approaches between the sensor electrodes 206 adjacent in the row direction.

Preferably, the auxiliary wirings 240 are arranged so that the edge portions of the auxiliary wirings 240 on the opposite side with respect to the terminals 208a (the edge portions on the opposite side to the edge portions connected to the sensor electrodes 206) are located outside the sensor frame region 212 (FIG. 14). Alternatively, the auxiliary wirings 240 are arranged so that these edge portions are located in the sensor frame region 212 and outside the display region 120 (i.e., a frame region). A length L of the portion of the auxiliary wiring 240 extending toward the opposite side with respect to the terminal 208a from an edge portion of the sensor region 210 or the display region 120 is preferably equal to or more than 1 mm and equal to or less than 1 cm. The virtual capacitance formed between the auxiliary wirings 240 and the input means can be secured by controlling the positions of the edge portions of the auxiliary wirings 240 in this way even when the input means approaches the edge portion of the display region 120. Therefore, it is possible to maintain the detection accuracy the same as that of the other region of the sensor region 210 (e.g., the vicinity of the center).

In addition, the sensor wirings 208 can each function as a sensor electrode because the pulse alternating voltage is applied although the widths thereof are small. In the case where the sensor electrode 206 and the sensor wiring 208 are collectively considered as one sensor electrode, there is still a difference in size of the sensor electrodes 206 when viewed in the row direction even if the structure of FIG. 13 is employed. On the other hand, the auxiliary wirings 240 are further added to the sensor electrodes 206 and extend in the direction away from the terminals 208a in the structure of FIG. 14. That is, the auxiliary wiring 240-4 connected to the sensor electrode 206-4 closest to the detector 222 extends in the direction away from the detector 222 and passes between the other sensor electrodes 206, while the auxiliary wiring 240-1 connected to the sensor electrode 206-1 located at the farthest position from the detector 222 is extremely short. Since this structure also allows the sensor wiring 208 and the auxiliary wiring 240 to function as a part of the sensor electrode 206 (the sensor electrode connected to the detector 222), the areas of the portions functioning as sensor electrodes are substantially the same between the sensor electrodes 206, and the capacitance difference caused by the difference in distance from the detector 222 is reduced. Note that a structure may be employed in which no auxiliary wiring is provided to the sensor electrode 206-1 at the position farthest from the detector 222.

(3) Modified Example 3

Figure 15:
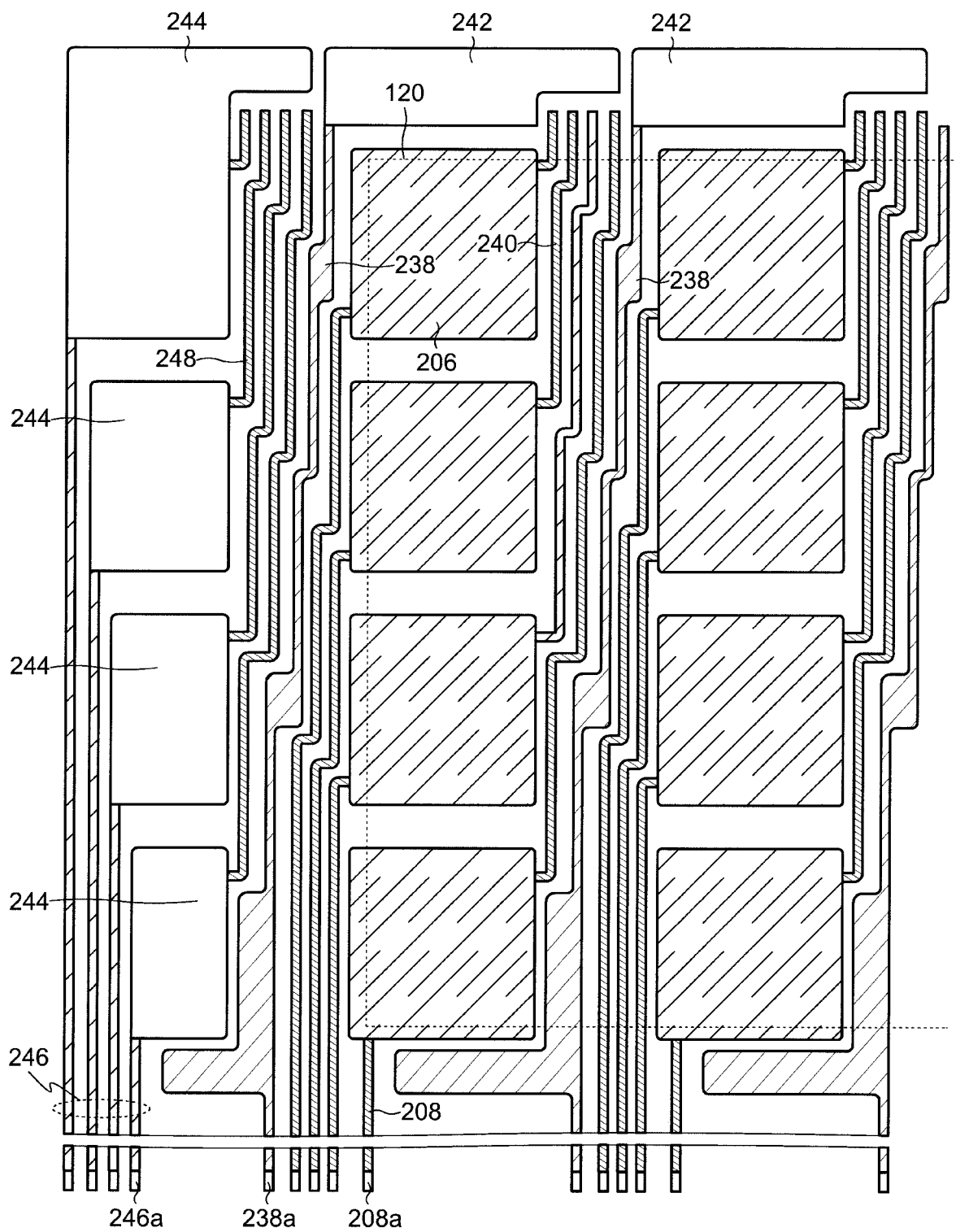
FIG. 15 is a schematic top view of a sensor module according to an embodiment of the present invention.
Figure 16:
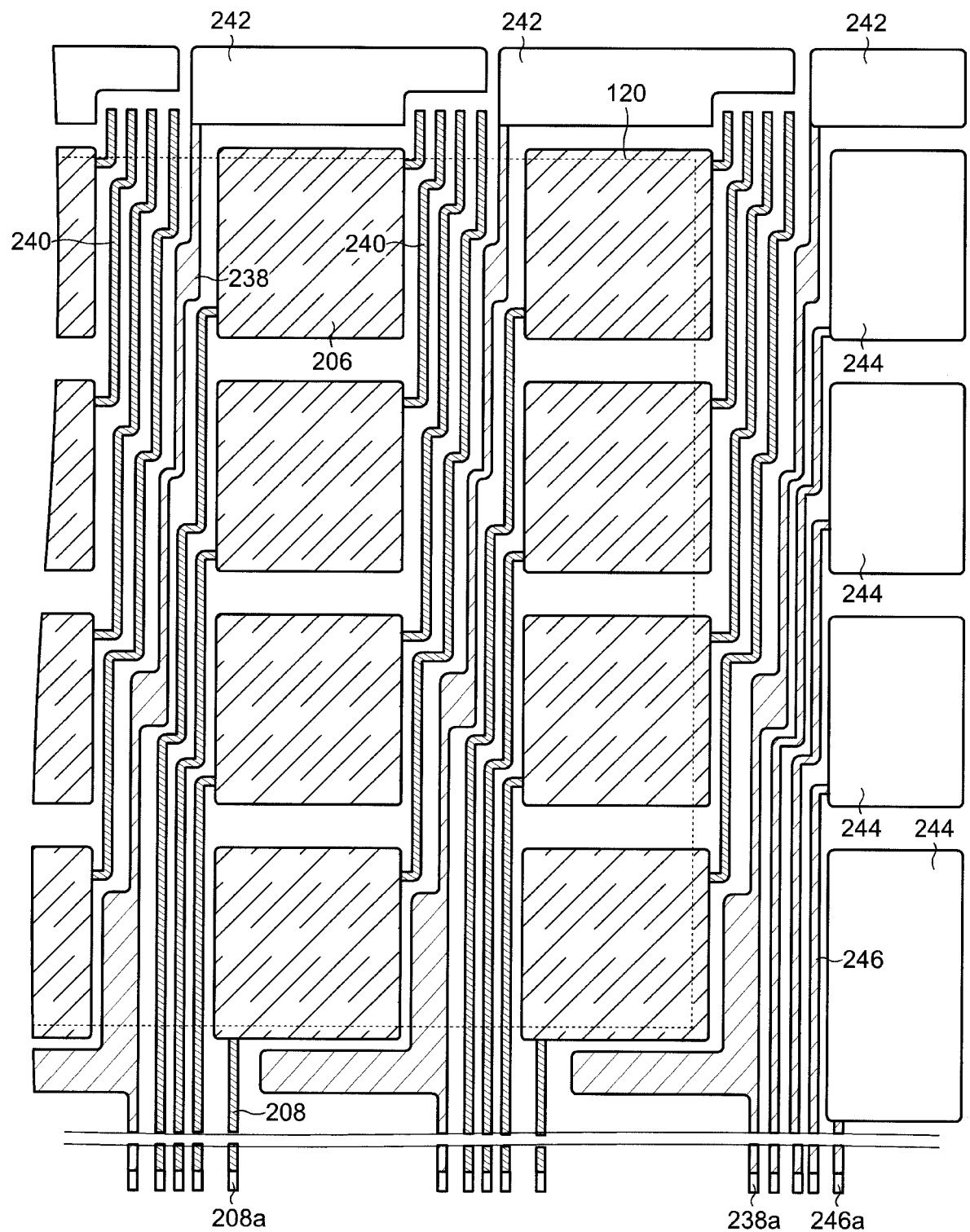
FIG. 16 is a schematic top view of a sensor module according to an embodiment of the present invention.

A non-contact type sensor is electrically influenced by the display module 110 more easily compared with the traditional contact type sensor. In order to reduce this influence, a plurality of shield electrodes may be arranged around the sensor region 210. A specific structure is shown in FIG. 15 and FIG. 16. FIG. 15 is a schematic top view including two sides of the sensor substrate 202, while FIG. 16 is a schematic top view of a counter region to the region shown in FIG. 15 with respect to the sensor region 210 as a standard.

As shown in these drawings, one shield electrode (first shield electrode) 242 may be disposed in each column. The shield electrode 242 is arranged in the sensor frame region 212 on the opposite side to the side of the sensor region 210 along which the terminals 208a are arranged. The shield electrodes 242 are provided so as not to overlap the display region 120. In other words, all of the plurality of pixels 116 is exposed from the shield electrodes 242. When the edge portions of the auxiliary wirings 240 connected to the sensor electrodes 206 are arranged in the sensor frame region 212, the shapes and the arrangement of the shield electrodes 242 may be adjusted so that these edge portions overlap the shield electrode 242 disposed in the same column in the row direction and the column direction. The shield electrodes 242 are also applied with the pulse alternating voltage of the same phase as the sensor electrodes 206. Hence, the plurality of shield electrodes 242 may be respectively connected to the aforementioned plurality of shield wirings 238 as shield wirings (first shield wirings). Since the shield electrodes 242 do not contribute to the identification of the coordinates of the input means, the shield wirings 238 may not be connected to the detector 222.

Alternatively, a pair of shield electrodes (second shield electrodes) 244 may be arranged in each row together with the shied electrodes 242 or instead of the shied electrodes 242. The pair of shield electrodes 244 is arranged to sandwich all of the sensor electrodes 206 in each row. The shield electrodes 244 are also disposed so as not to overlap the display region 120. Therefore, all of the pixels 116 are exposed from the shield electrodes 244. A shield wiring (second shield wiring) 246 is electrically connected to each shield electrode 244. The shield wirings 246 form terminals 246a in the sensor frame region 212 on the side along which the terminals 208a of the sensor wirings 208 are formed. The terminals 246a are connected to the first connector 218, by which the shield wirings 246 can be supplied with a voltage from the power circuit 220. Each shield electrode 244 is applied with the pulse alternating voltage of the same phase as the sensor electrodes 206. Since the shield electrodes 244 also do not contribute to the identification of the coordinates of the input means similar to the shield electrodes 242, the shield wirings 246 may not be connected to the detector 222. Although not illustrated, each shield wiring 246 does not overlap with and is exposed from at least all of the shield electrodes 244 other than the shied electrode 244 connected thereto similar to the sensor wirings 208. Alternatively, each shield wiring 246 does not overlap with and is exposed from all of the shield electrodes 244.

Similar to the sensor electrodes 206, auxiliary wirings (auxiliary shield wirings) 248 may also be connected to the shield electrodes 244. That is, the auxiliary shield wirings 248 respectively corresponding to the plurality of shield electrodes 244 may be disposed in the sensor frame region 212. An edge of each auxiliary shield wiring 248 is electrically connected to the corresponding shield electrode 244, and each auxiliary shield wiring 248 extends in the direction opposite to the terminal 246a. The other terminal portion of the auxiliary shield wiring 248 is not connected to any other conductive component.

As described above, the shield electrodes 242 and/or the shield electrodes 244 are disposed in the sensor frame region 212 in the Modified Example 3. Hence, even if the input means approaches the edge portion of the sensor region 210, detection without any variation is feasible because a uniform electric field is generated between the input means and the sensor region 208 and because a part of the electric filed overlapping the sensor electrodes 206 is detected as a capacitance variation. In addition, the detection accuracy does not decrease because it is possible to suppress the capacitance formation between the outside of the sensor region 210 and the input means. Furthermore, the formation of shield electrodes 242 and/or the shield electrodes 244 allows the formation of the structure the same as the sensor region 210 in the outside of the display region 120, by which not only can the detection sensitivity at the edge portion of the display region 120 be maintained, but also the influence of the display module 110 can be effectively shielded.

Moreover, the plurality of shield electrodes 242 and/or the plurality of shield electrodes 244 are disposed. In a case where a single number of shield electrodes is disposed in the sensor frame region 212, the approach of the input means to the edge portion of the sensor region 210 influences the whole of the periphery of the sensor region 210. However, the detection accuracy can be maintained even at the edge portion of the sensor region 210 because the decrease in amount of potential variation of the sensor electrodes 206 caused when the input means approaches the edge portion of the sensor region 210 can be limited to a local region by providing the plurality of shield electrodes 242 and/or the plurality of shield electrodes 244. Therefore, the coordinates of the input means can be more accurately identified.

Figure 17A:
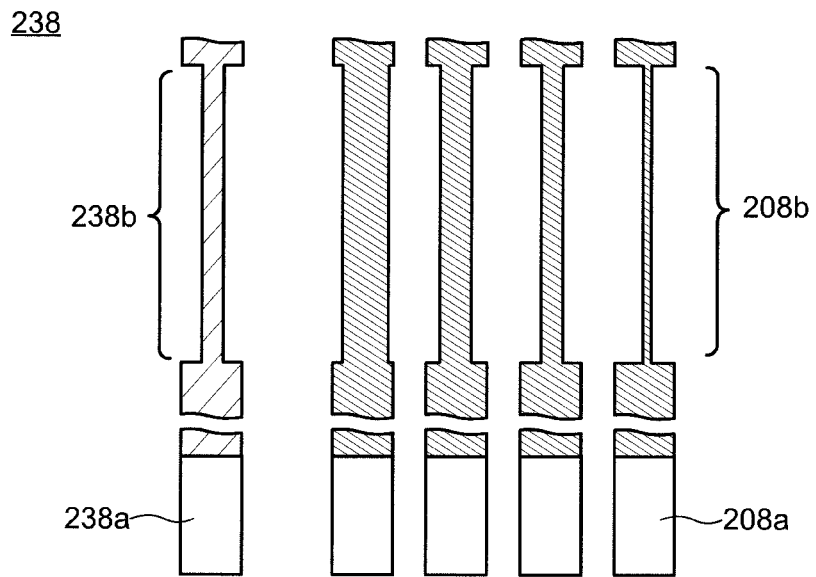
FIG. 17A is a schematic top view of a sensor module according to an embodiment of the present invention.

Here, when the pulse alternating voltage is supplied to the shield electrode 242 through the shield wiring 238, a resistance-adjusting portion 238b may be formed between the terminal 238a and the shield electrode 242 in the shield wiring 238 as shown in FIG. 17A. The resistance-adjusting portion 238b may be formed in the sensor region 210 or the sensor frame region 212. The resistance-adjusting portion 238b may be formed considering the capacitance of the shield electrode 242 so that the time constant of the shield electrode 242 is the same or substantially the same as the time constant of other sensor electrodes 206. Alternatively, the resistance-adjusting portion 208b is formed in all of the sensor wirings 208 connected to the sensor electrodes 206 to match the time constants of the shield electrode 242 and the sensor electrodes 206 in each column without forming the resistance-adjusting portion 238b in the shield wiring 238.

Figure 17B:
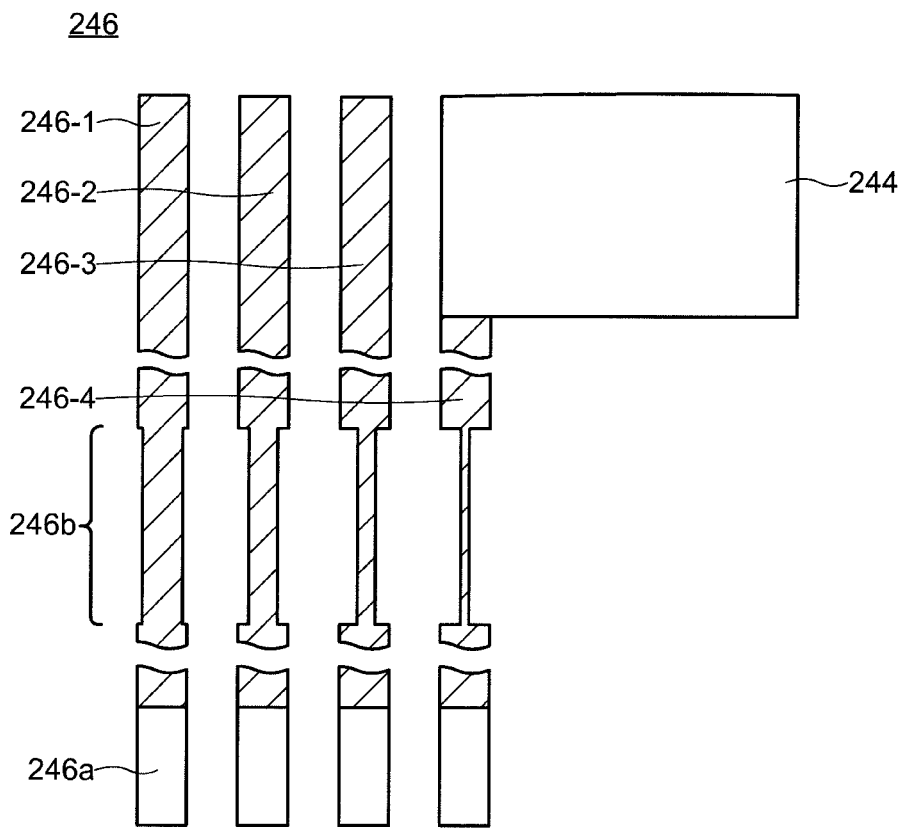
FIG. 17B is a schematic top view of a sensor module according to an embodiment of the present invention.
Figure 18:
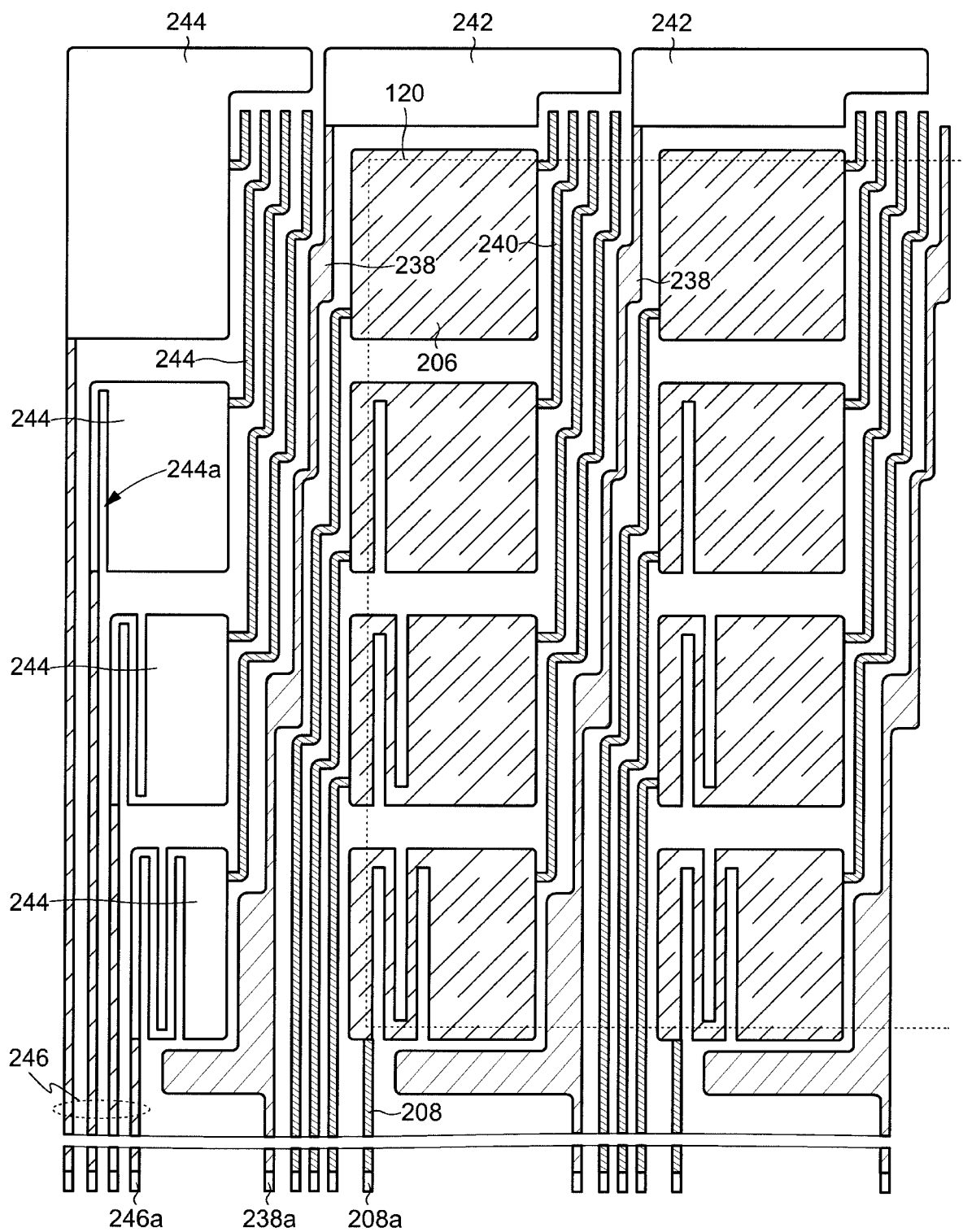
FIG. 18 is a schematic top view of a sensor module according to an embodiment of the present invention.

Similarly, a resistance-adjusting portion 246b may be formed between the shield electrode 244 and the terminal 246a in the shield wiring 246 connected to the shield electrode 244 as shown in FIG. 17B. Similar to the resistance-adjusting portion 238b, the resistance-adjusting portion 246b may be formed considering the capacitance of the shield electrode 244 so that the time constant of the shield electrode 244 is the same or substantially the same as the time constant of other sensor electrodes 206. Alternatively, at least one cutoff 244a may be formed in all of or at least one of the shield electrodes 244 instead of or together with the resistance-adjusting portion 246b as shown in FIG. 18. The terminals 246a of the shield wirings 246 are also arranged on the side of the sensor region 210 along which the terminals 208a are disposed. Hence, the cutoff 244a is formed so that areas thereof decrease with increasing distance from the terminal 246a.

Although not illustrated, the resistance of the shield electrode 242 may be adjusted by providing a cutoff to the shied electrode 242 instead of or together with the resistance-adjusting portion 238b. The resistance adjustment may be performed by adjusting the area of the cutoff so as to have the same or substantially the same time constant as the sensor electrodes 206. Note that, when no resistance-adjusting portion 238b is provided to the shield wiring 238 connected to the shield electrode 242 and no cutoff or the like is formed in the shield electrode 242, the resistance-adjusting portion 208b may be formed in all of the sensor wirings 208 connected to the sensor electrodes 206 or the cutoff 206a may be formed in all of the sensor electrodes 206 together with or instead of the resistance-adjusting portion 208b so as to have the time constant the same as or substantially the same as that of the shield electrode 242.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A sensor module comprising:
 a sensor substrate having a sensor region and a sensor frame region surrounding the sensor region;
 a plurality of sensor electrodes located over the sensor region and arranged in a matrix form having a plurality of rows and a plurality of columns;
 a plurality of sensor wirings respectively corresponding to the plurality of sensor electrodes, electrically connected to the corresponding sensor electrodes respectively, and each having a terminal over the sensor frame region, and
 a plurality of shield wirings extending from the sensor frame region to the sensor region,
 wherein the plurality of terminals is arranged along a side of the sensor region,
 at least one of the sensor wirings connected to the sensor electrodes includes a resistance-adjusting portion in each column,
 the at least one of the sensor wirings has a pair of outermost edges facing each other,
 in the at least one of the sensor wirings, a first width of a first portion between the resistance-adjusting portion and the terminal and a second width of a second portion between the resistance-adjusting portion and the sensor electrode are the same as each other but are larger than a third width of the resistance-adjusting portion, each of the first to third widths being a distance between the pair of the outermost edges,
 a first length of the first portion is longer than a second length of the terminal, and directions of the first and second lengths are perpendicular to a direction of the first width,
 all of the plurality of sensor electrodes exist in the same layer,
 each of the plurality of shield wirings is spaced away from the plurality of sensor electrodes,
 the plurality of shield wirings and at least some columns of the plurality of columns of the sensor electrodes are alternately arranged, and
 the plurality of sensor electrodes and the plurality of shield wirings are configured to be applied with a pulse alternating voltage of a same phase.

2. The sensor module according to claim 1,
wherein, in each column,
the plurality of sensor wirings respectively connected to the plurality of sensor electrodes each includes the resistance-adjusting portion other than the longest sensor wiring, and
the resistance of the resistance-adjusting portion decreases with increasing distance between the terminal and the sensor electrode.

3. The sensor module according to claim 1,
wherein, in each column,
the plurality of sensor wirings respectively connected to the plurality of sensor electrodes each includes the resistance-adjusting portion, and
the resistance of the resistance-adjusting portion decreases with increasing distance between the terminal and the sensor electrode.

4. The sensor module according to claim 1,
wherein the resistances of the plurality of sensor wirings are the same as each other.

5. The sensor module according to claim 1,
wherein the resistance-adjusting portions have the same length as one another and are different in width from each other.

6. The sensor module according to claim 1, wherein the resistance-adjusting portion includes a plurality of linear portions extending in different directions.

7. A sensor module comprising:
a sensor substrate having a sensor region and a sensor frame region surrounding the sensor region;
a plurality of sensor electrodes located over the sensor region and arranged in a matrix form having a plurality of rows and a plurality of columns;
a plurality of sensor wirings respectively corresponding to the plurality of sensor electrodes, electrically connected to the corresponding sensor electrodes respectively, and each having a terminal over the sensor frame region; and
a plurality of shield wirings extending from the sensor frame region to the sensor region,
wherein the plurality of terminals is arranged along a side of the sensor region,
at least one of the sensor electrodes in each column has at least one cutoff in the sensor region, the at least one cutoff having a concave shape that is an open shape,
each of the plurality of shield wirings is spaced away from the plurality of sensor electrodes,
the plurality of shield wirings and at least some columns of the plurality of columns of the sensor electrodes are alternately arranged,
the plurality of sensor electrodes and the plurality of shield wirings are configured to be applied with a pulse alternating voltage of a same phase, and
all of the plurality of sensor electrodes exist in the same layer.

8. The sensor module according to claim 7,
wherein, in each column,
the plurality of sensor electrodes other than the sensor electrode connected to the longest sensor wiring each has the at least one cutoff, and
an area of the at least one cutoff decreases with increasing distance from the terminal.

9. The sensor module according to claim 7,
wherein, in each column,
the plurality of sensor electrodes each has the at least one cutoff, and
an area of the at least one cutoff decreases with increasing distance from the terminal.

10. The sensor module according to claim 7, wherein
the at least one of the sensor electrodes includes a plurality of linear portions extending in different directions, and
the plurality of linear portions form the concave shape.

11. A display device comprising:
a display module comprising an array substrate comprising a plurality of pixels; and
a sensor module over the display module, the sensor module comprising:
a sensor substrate having a sensor region and a sensor frame region surrounding the sensor region;
a plurality of sensor electrodes located over the sensor region and arranged in a matrix form having a plurality of rows and a plurality of columns;
a plurality of sensor wirings respectively corresponding to the plurality of sensor electrodes, electrically connected to the corresponding sensor electrodes respectively, and each having a terminal over the sensor frame region, and
a plurality of shield wirings extending from the sensor frame region to the sensor region,
wherein the plurality of terminals is arranged along a side of the sensor region,
at least one of the sensor wirings connected to the sensor electrodes includes a resistance-adjusting portion in each column,
the at least one of the sensor wirings has a pair of outermost edges facing each other,
in the at least one of the sensor wirings, a first width of a first portion between the resistance-adjusting portion and the terminal and a second width of a second portion between the resistance-adjusting portion and the sensor electrode are the same as each other but are larger than a third width of the resistance-adjusting portion, each of the first to third widths being a distance between the pair of the outermost edges,
a first length of the first portion is longer than a second length of the terminal, and directions of the first and second lengths are perpendicular to a direction of the first width,
all of the plurality of sensor electrodes exist in the same layer,
each of the plurality of shield wirings is spaced away from the plurality of sensor electrodes,
the plurality of shield wirings and at least some columns of the plurality of columns of the sensor electrodes are alternately arranged, and
the plurality of sensor electrodes and the plurality of shield wirings are configured to be applied with a pulse alternating voltage of a same phase.

12. The display device according to claim 11,
wherein the resistance-adjusting portions have the same length as one another and are different in width from each other.

13. The sensor module according to claim 11, wherein the resistance-adjusting portion includes a plurality of linear portions extending in different directions.

* * * * *